(12) United States Patent
Takagi et al.

(10) Patent No.: US 7,704,581 B2
(45) Date of Patent: Apr. 27, 2010

(54) SEMI-REFLECTIVE FILM AND REFLECTIVE FILM FOR OPTICAL INFORMATION RECORDING MEDIUM, OPTICAL INFORMATION RECORDING MEDIUM, AND SPUTTERING TARGET

(75) Inventors: Katsutoshi Takagi, Kobe (JP); Junichi Nakai, Kobe (JP); Yuuki Tauchi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 1164 days.

(21) Appl. No.: 11/103,615

(22) Filed: Apr. 12, 2005

(65) Prior Publication Data

US 2005/0238839 A1    Oct. 27, 2005

(30) Foreign Application Priority Data

Apr. 21, 2004   (JP) ............................. 2004-125932

(51) Int. Cl.
 *B32B 3/02*     (2006.01)
(52) U.S. Cl. .................. 428/64.1; 428/64.4; 430/270.12
(58) Field of Classification Search ................ 428/64.1, 428/64.4; 430/270.12
 See application file for complete search history.

(56) References Cited

U.S. PATENT DOCUMENTS

| | | | | |
|---|---|---|---|---|
| 4,998,239 | A * | 3/1991 | Strandjord et al. ....... | 369/275.1 |
| 5,948,497 | A | 9/1999 | Hatwar et al. | |
| 5,989,669 | A * | 11/1999 | Usami ...................... | 428/64.1 |
| 6,007,889 | A | 12/1999 | Nee | |
| 6,177,166 | B1 * | 1/2001 | Ohno et al. ................ | 428/64.1 |
| 6,280,811 | B1 | 8/2001 | Nee | |
| 6,312,779 | B1 * | 11/2001 | Hirotsune et al. .......... | 428/64.1 |
| 6,544,616 | B2 * | 4/2003 | Nee .......................... | 428/64.1 |
| 6,689,444 | B2 | 2/2004 | Nakai et al. | |
| 2003/0143342 | A1 | 7/2003 | Fujii et al. | |
| 2003/0180177 | A1 | 9/2003 | Murata | |
| 2004/0028912 | A1 | 2/2004 | Tauchi et al. | |
| 2004/0226818 | A1 | 11/2004 | Takagi et al. | |
| 2004/0238356 | A1 | 12/2004 | Matsuzaki et al. | |
| 2004/0253137 | A1 * | 12/2004 | Gehlert et al. .............. | 420/501 |
| 2004/0263984 | A1 | 12/2004 | Nakai et al. | |
| 2005/0008883 | A1 | 1/2005 | Takagi et al. | |
| 2005/0238839 | A1 | 10/2005 | Takagi et al. | |

FOREIGN PATENT DOCUMENTS

| | | |
|---|---|---|
| CN | 1483852 A | 3/2004 |
| DE | 103 36 228 A1 | 4/2004 |
| JP | 2005-048231 | 2/2005 |
| JP | 2006-523913 | 10/2006 |
| WO | WO 2004/094135 | 11/2004 |

OTHER PUBLICATIONS

U.S. Appl. No. 10/999,027, filed Nov. 3, 2004, Takagi, et al.
U.S. Appl. No. 11/158,079, filed Jun. 22, 2005, Tauchi, et al.
U.S. Appl. No. 11/168,497, filed Jun. 29, 2005, Takagi, et al.
U.S. Appl. No. 11/103,615, filed Apr. 12, 2005, Takagi, et al.
Patent Abstracts of Japan, JP 2000-057627, Feb. 25, 2000.
U.S. Appl. No. 11/333,492, filed Jan. 18, 2006, Tauchi, et al.
U.S. Appl. No. 11/375,036, filed Mar. 15, 2006, Tauchi, et al.
U.S. Appl. No. 11/428,045, filed Jun. 30, 2006, Fujii, et al.
U.S. Appl. No. 11/425,062, filed Jun. 19, 2006, Tauchi, et al.
U.S. Appl. No. 11/425,068, filed Jun. 19, 2006, Nakai, et al.
U.S. Appl. No. 11/612,791, Dec. 19, 2006, Nakano, et al.
U.S. Appl. No. 12/167,597, filed Jul. 3, 2008, Takagi, et al.
U.S. Appl. No. 12/198,520, filed Aug. 26, 2008, Tauchi, et al.
U.S. Appl. No. 12/261,781, filed Oct. 30, 2008, Matsuzaki.
U.S. Appl. No. 12/266,065, filed Nov. 6, 2008, Tauchi, et al.

* cited by examiner

*Primary Examiner*—Elizabeth Mulvaney
(74) *Attorney, Agent, or Firm*—Oblon, Spivak, McClelland, Maier & Neustadt, L.L.P.

(57) ABSTRACT

The present invention has been completed in view of such situation, and an object of the present invention is to find a Ag based alloy which exhibits high cohesion resistance, high light resistance, high heat resistance, high reflectivity, high transmissivity, low absorptivity, and high thermal conductivity of the level which had not been realized by the pure Ag or by the conventional Ag alloys, and on the bases of such alloy, to provide a semi-reflective film and a reflective film for an optical information recording medium provided with excellent writing/reading properties and long term reliability; sputtering target for an optical information recording medium used in depositing such semi-reflective film and the reflective film; and an optical information recording medium provided with such semi-reflective film or the reflective film.

A semi-reflective film or reflective film for an optical information recording medium comprising a Ag based alloy, wherein the Ag based alloy comprises 0.005 to 0.40% (at % unless otherwise noted) of Bi and 0.05 to 5% in total of at least one element selected from Zn, Al, Ga, In, Si, Ge, and Sn.

28 Claims, No Drawings

SEMI-REFLECTIVE FILM AND REFLECTIVE FILM FOR OPTICAL INFORMATION RECORDING MEDIUM, OPTICAL INFORMATION RECORDING MEDIUM, AND SPUTTERING TARGET

BACKGROUND OF THE INVENTION

This invention relates to a semi-reflective film and a reflective film for an optical information recording medium which is provided with a high cohesion resistance, high light resistance, and high heat resistance simultaneously with a high reflectivity, high transmissivity, low absorptivity, and high thermal conductivity in the field of optical information recording medium such as CD (Compact Disc), DVD (Digital Versatile Disc), Blu-ray Disc, and HD DVD; a sputtering target for an optical information recording medium which is used in depositing such a semi-reflective film or reflective film; and an optical information recording medium provided with such a semi-reflective film or reflective film.

Optical information recording mediums (optical discs) include various types, and the three main types categorized by the writing/reading system are read only, write-once, and rewritable optical discs. In order to increase storage capacity, single side, multilayer optical discs have also been developed from the ordinary single side, single layer optical discs. For example, in the case of a single side, dual layer optical disc wherein the signals are written and read in the recording layer which is farther from the side of the laser beam incidence, the laser beam should be transmitted through the recording layer which is nearer to the laser beam incidence, reflected by the farther recording layer, and again transmitted through the recording layer which is nearer to the laser beam incidence. Accordingly, a semi-reflective film capable of reflecting and transmitting the laser beam is used for the recording layer which is nearer to the laser beam incidence.

The materials which function as a semi-reflective film include metals such as Ag, Al, Au, Pt, Rh, and Cr and elemental semiconductors such as Si and Ge. Among these, pure Ag and Ag alloys containing Ag as their main component are featured in view of (1) high light efficiency (=reflectivity+transmissivity), (2) high reflectivity for the blue-violet laser (wavelength, 405 nm) used in Blu-ray disc and HD DVD, and (3) high thermal conductivity which enables adequate diffusion of the heat generated in the recording film upon recording of the signals. Such Ag based materials exhibit excellent properties for use as a semi-reflective film of an optical disc including high reflectivity, high transmissivity, low absorptivity (absorptivity=100%−(reflectivity+transmissivity)), and high thermal conductivity. However, in order to accomplish sufficient function as a semi-reflective film of an optical disc with long term reliability, the Ag based materials need to overcome the drawbacks of the Ag based materials, namely, (1) cohesion resistance, (2) light resistance, and (3) heat resistance.

[Drawback 1] Cohesion Resistance

Ag based materials are likely undergo cohesion under the effect of heat and halogen (fluorine, chlorine, bromine, iodine, etc.). When it is kept under the high temperature, high humidity conditions used in the reliability test of an optical disc, or disposed in contact with a halogen-containing organic material (of the organic dye recording film, the protective layer, or the adhesive layer), cohesion may take place, resulting in the increase in the surface roughness of the thin film or loss of the continuity of the thin film, which may in turn invite loss of the function of the material as a semi-reflective film or the reflective film.

[Drawback 2] Light Resistance

For example, a single side, dual layer, read only optical disc has a basic cross sectional structure of polycarbonate (PC) substrate/semi-reflective film/adhesive layer/reflective film/PC substrate. When such an optical disc is irradiated by a Xe lamp (a lamp having a spectrum resembling that of the sunlight) in the so called "light resistance test", the semi-reflective film experiences decrease in the reflectivity when the film comprises a Ag based material, and in such a case, reading of the signal becomes impossible once the reflectivity is reduced to below the threshold value that is required for detecting the signal to be read.

[Drawback 3] Heat Resistance

For example, a single side, dual layer, write-once optical disc has a basic cross sectional structure of PC substrate/recording film/semi-reflective film/spacer/recording film/reflective film/PC substrate, and a single side, dual layer, rewritable optical disc has a basic cross sectional structure of PC substrate/dielectric and protective layer/interface layer/recording film/interface layer/dielectric and protective layer/semi-reflective film/intermediate layer/dielectric and protective layer/interface layer/recording film/interface layer/dielectric and protective layer/reflective film/PC substrate. In the case of recordable optical disc including such write-once and rewritable optical discs, the recording layer is heated to a temperature as high as 300 to 600° C. during the writing, and a very severe thermal hysteresis is applied to the semi-reflective film or the reflective film. The growth of the crystal grains of the thin film and loss of the continuity of the thin film caused as a result of such thermal hysteresis impair the function of the semi-reflective film and the reflective film.

Various attempts have been made to improve the pure Ag, mainly by alloying the Ag. For example, corrosion resistance is improved in U.S. Pat. No. 6,007,889 and the like by adding Au, Pd, Cu, Rh, Ru, Os, Ir, or Pt to Ag; in U.S. Pat. No. 6,280,811, Published Japanese translation of PCT international publication for patent application 2002-518596, and the like, by adding Au, Pd, Cu, Rh, Ru, Os, Ir, Be, or Pt to Ag; and in U.S. Pat. No. 5,948,497, Japanese Patent Application Laid-Open No. Heisei 6-208732, and the like by adding Pd or Cu to Ag. The inventors of the present invention have also disclosed in Japanese Patent No. 3365762 a method for improving crystal structure stability by adding Nd to Ag wherein the crystal structure stability is attained by suppressing Ag diffusion and crystal grain development.

In spite of such efforts, no Ag based alloy has been found that exhibits high reflectivity, high transmissivity, low absorptivity, and high thermal conductivity simultaneously with high cohesion resistance, high light resistance, and high heat resistance, and accordingly, there is a strong demand for a Ag based alloy which fulfill requirements for all these properties.

SUMMARY OF THE INVENTION

The present invention has been completed in view of such situation, and an object of the present invention is to find a Ag based alloy which exhibits high cohesion resistance, high light resistance, high heat resistance, high reflectivity, high transmissivity, low absorptivity, and high thermal conductivity of the level which had not been realized by the pure Ag or by the conventional Ag alloys, and on the bases of such alloy, to provide a semi-reflective film and a reflective film for an optical information recording medium provided with excellent writing/reading properties and long term reliability; sputtering target for an optical information recording medium used in depositing such semi-reflective film and the reflective film; and an optical information recording medium provided with such semi-reflective film or the reflective film.

A first aspect of the present invention is directed to a semi-reflective film or reflective film for an optical information recording medium comprising a Ag based alloy, wherein the Ag based alloy comprises 0.005 to 0.40% (at % unless otherwise noted) of Bi and 0.05 to 5% in total of at least one element selected from Zn, Al, Ga, In, Si, Ge, and Sn.

A second aspect of the present invention is directed to the semi-reflective film or reflective film for an optical information recording medium comprising a Ag based alloy of the first aspect wherein the semi-reflective film or reflective film has a film structure wherein the Bi is rich in the top and/or bottom interface.

A third aspect of the present invention is directed to the semi-reflective film or reflective film for an optical information recording medium comprising a Ag based alloy of the first aspect or second aspect wherein the semi-reflective film or reflective film has a structure wherein the at least one element selected from Zn, Al, Ga, In, Si, Ge, and Sn is rich in the top and/or bottom interface.

A fourth aspect of the present invention is directed to the semi-reflective film or reflective film for an optical information recording medium comprising a Ag based alloy of any one of the first aspect to third aspect wherein the Ag based alloy further comprises at least one rare earth metal element.

A fifth aspect of the present invention is directed to the semi-reflective film or reflective film for an optical information recording medium comprising a Ag based alloy of the fourth aspect wherein the rare earth metal element is Nd and/or Y contained at a total content of 0.1 to 2%.

A sixth aspect of the present invention is directed to the semi-reflective film or reflective film for an optical information recording medium comprising a Ag based alloy of any one of the first aspect to fifth aspect wherein the Ag based alloy further comprises at least one element selected from Cu, Au, Rh, Pd, and Pt at a total content of 0.1 to 3%.

A seventh aspect of the present invention is directed to an optical information recording medium having the semi-reflective film comprising a Ag based alloy of any one of the first aspect to sixth aspect.

An eighth aspect of the present invention is directed to an optical information recording medium having the reflective film comprising a Ag based alloy of any one of the first aspect to sixth aspect.

A ninth aspect of the present invention is directed to a Ag based alloy sputtering target wherein the Ag based alloy comprises 0.05 to 4.5% of Bi and 0.05 to 5% in total of at least one element selected from Zn, Al, Ga, In, Si, Ge, and Sn.

A tenth aspect of the present invention is directed to a Ag based alloy sputtering target of the ninth aspect wherein the Ag based alloy further comprises at least one rare earth metal element.

An eleventh aspect of the present invention is directed to a Ag based alloy sputtering target of the tenth aspect wherein the rare earth metal element is Nd and/or Y contained at a total content of 0.1 to 2%.

A twelfth aspect of the present invention is directed to a Ag based alloy sputtering target of any one of the ninth aspect to eleventh aspect wherein the Ag based alloy further comprises at least one element selected from Cu, Au, Rh, Pd, and Pt at a total content of 0.1 to 3%.

As described above, the semi-reflective film and the reflective film for an optical information recording medium of the present invention are provided with the high cohesion resistance, high light resistance, and high heat resistance simultaneously with the high reflectivity, high transmissivity, low absorptivity, and high thermal conductivity, and the optical information recording medium produced will be provided with dramatically improved writing/reading properties as well as excellent long term reliability. The sputtering target of the present invention is well adapted for depositing the semi-reflective film or the reflective film as described above, and the semi-reflective film and the reflective film produced by using such sputtering target are excellent in the alloy composition, distribution of the alloying element, and uniformity in the film plane direction, and such film will also enjoy low impurity content, and therefore, the resulting semi-reflective film or the reflective film will enjoy high performance, enabling the production of an optical information recording medium having excellent writing/reading properties and excellent long term reliability. Furthermore, the optical information recording medium of the present invention will have remarkably improved writing/reading properties and long term reliability.

DETAILED DESCRIPTION OF THE PREFERRED EMBODIMENTS

In view of the situation as described above, the inventors of the present invention have made an intensive study to provide a semi-reflective film and a reflective film comprising a Ag based alloy, which are adapted for use in an optical information recording medium, and which exhibit high cohesion resistance, high light resistance, and high heat resistance simultaneously with high reflectivity, high transmissivity, low absorptivity, and high thermal conductivity. More specifically, the inventors deposited various Ag based alloy thin films of various alloy composition by sputtering various Ag based alloy sputtering targets, and evaluated these films for their film composition, film structure, cohesion resistance, light resistance, heat resistance, reflectivity, transmissivity, absorptivity, and thermal conductivity. The inventors then found that the Ag based alloy semi-reflective film and reflective film for an optical information recording medium containing 0.005 to 0.40% of Bi and 0.05 to 5% in total of at least one element selected from Zn, Al, Ga, In, Si, Ge, and Sn are provided with excellent cohesion resistance, light resistance, and heat resistance, simultaneously with high reflectivity, high transmissivity, low absorptivity, and high thermal conductivity surpassing those of the films made of the pure Ag or the conventional Ag alloys since the resulting film has a structure wherein these alloying elements are concentrated in the top and/or the bottom interface. The present invention has been completed on the bases of such finding. The present invention is hereinafter described in further detail.

The inventors of the present invention have demonstrated that the Ag based alloy thin film containing Bi and at least one element selected from Zn, Al, Ga, In, Si, Ge, and Sn has a film structure wherein the alloying elements have concentrated to the top and/or bottom interface since these alloying elements diffuses to the top and/or bottom interface during the deposition of the thin film. Such concentration of the alloying element to the top and/or bottom interface is believed to have been caused by the high diffusion rate of all of the Bi, Zn, Al, Ga, In, Si, Ge, and Sn in the Ag, which results in the likeliness to be separated from the Ag. Among such elements, Bi has low melting point and high vapor pressure, and therefore, Bi exhibits behavior of re-evaporation from the thermally activated film surface, and diffusion to the top and/or bottom interface by the thermal activation. Such behavior of the Bi promotes diffusion to the top and/or bottom interface which is a behavior inherent to the Zn, Al, Ga, In, Si, Ge, and Sn, and the formation of the unique film structure becomes prominent by the combined addition effects of the Bi with the Zn, Al, Ga, In, Si, Ge, or Sn. It was also revealed that such effect is an effect of combined addition, which is not achieved when Bi is combined with other alloying elements. The drawbacks of the Ag based material as described above, namely, the cohesion resistance, light resistance, and heat resistance is improved by the formation of such unique film structure. Such improvements are realized by the mechanisms as described below.

[Drawback 1] Cohesion Resistance

Cohesion of the Ag based material caused by heat is a result of the Ag diffusion at the surface at high temperature, and such Ag diffusion at the surface is suppressed by the presence of the alloying element rich layer at the top and/or bottom interface of the film as in the Ag based alloy thin film of the present invention, and the cohesion resistance is thereby improved. On the other hand, the cohesion caused by a halogen (fluorine, chlorine, bromine, iodine, etc.) takes place in the environment where a halogen is present, and the cohesion occurs by the sequential steps of adsorption of the halogen onto the top and/or the bottom interface, generation of a silver halide, and the Ag cohesion starting from the generation of the silver halide, and cohesion resistance can be improved by blocking the adsorption of the halogen onto the top and/or bottom interface by the alloying element rich layer which suppresses the subsequent generation of the silver halide and the Ag cohesion.

[Drawback 2] Light Resistance

Decrease in the reflectivity for the light irradiated by a Xe lamp (a lamp having the spectrum resembling the sunlight) that takes place, for example, in a single side, dual layer, read only optical disc having the basic cross sectional structure of PC substrate/semi-reflective film/adhesive layer/reflective film/PC substrate only when the semi-reflective film comprises a Ag based material is a phenomenon caused by diffusion and penetration of the Ag atom constituting the Ag based semi-reflective film into the adjacent PC substrate and/or adhesive layer. When direct contact between the Ag based semi-reflective film and the PC substrate or the adhesive layer is avoided as in the case of the Ag based alloy thin film of the present invention having an alloying element rich layer at the top and/or bottom interface, diffusion and penetration of the Ag atom is suppressed, and decrease in the reflectivity does not occur even if the disc is irradiated by a Xe lamp. The light resistance is thereby improved.

[Drawback 3] Heat Resistance

Heat resistance can be improved even for the semi-reflective film of a single side, multilayer recordable (write-once or rewritable) optical disc which experiences extremely severe thermal hysteresis due to the temperature elevation to the range of 300 to 600° C. during the signal recording. That is, when the film has an alloying element rich layer at the top and/or bottom interface as in the case of the Ag based alloy thin film of the present invention, Ag diffusion is suppressed by the presence of such alloying element rich layer, and the crystal grain growth and formation of in discontinuation of the film are suppressed, thereby improving the heat resistance.

The Ag based alloy thin film of the present invention has an alloying element rich layer at the top and/or the bottom interface of the film, and the substantial part of the film comprises a film structure having a composition resembling that of the pure Ag with relatively low content of the alloying elements, and since the part contributing for the optical properties and the thermal properties has the composition resembling that of the pure Ag, the film exhibits high reflectivity, high transmissivity, low absorptivity, and high thermal conductivity.

The Ag based alloy thin film of the present invention has unique film structure, and the alloying element rich layer at the top and/or the bottom interface of the film contributes for the development of the high cohesion resistance, high light resistance, and high heat resistance while the part comprising the composition almost like the pure Ag contributes for the development of the high reflectivity, high transmissivity, low absorptivity, and high thermal conductivity, and this results in the excellent properties of the semi-reflective film and the reflective film of the optical information recording medium.

The Ag based alloy semi-reflective film and the reflective film for the optical information recording medium of the present invention have the characteristic feature that they contain Bi at a content of 0.005 to 0.40%, and at least one element selected from Zn, Al, Ga, In, Si, Ge, and Sn at a total content of 0.05 to 5%. Addition of the Bi, Zn, Al, Ga, In, Si, Ge, and Sn results in the improvement of the cohesion resistance, the light resistance, and the heat resistance, and such improvement becomes clear with the increase in the amount of the addition while decrease in the reflectivity, the transmissivity, and the thermal conductivity as well as increase in the absorptivity occur with the increase in the amount of such addition. Therefore, in the present invention, the Bi is added at a content of 0.005 to 0.40%, and the at least one element selected from Zn, Al, Ga, In, Si, Ge, and Sn is added at a total content of 0.05 to 5%. Bi content of less than 0.005% is not preferable since the film does not exhibit the high cohesion resistance, high light resistance, and high heat resistance, whereas Bi content in excess of 0.40% is also not preferable since the resulting film will not exhibit the high reflectivity, high transmissivity, low absorptivity, and high thermal conductivity. Therefore, Bi is preferably contained at a content of 0.005 to 0.40%, more preferably at a content of 0.01 to 0.3%, and most preferably at a content of 0.05 to 0.2%. On the other hand, addition of the at least one element selected from Zn, Al, Ga, In, Si, Ge, and Sn at a total content of less than 0.05% is not preferable since the resulting film does not exhibit the high cohesion resistance, high light resistance, and high heat resistance, whereas addition of the at least one element selected from Zn, Al, Ga, In, Si, Ge, and Sn at a total content in excess of 5% is also not preferable since the resulting film does not exhibit the high reflectivity, high transmissivity, low absorptivity, and high thermal conductivity. Therefore, the at least one element selected from Zn, Al, Ga, In, Si, Ge, and Sn is preferably added at a total content of 0.05 to 5%, more preferably at a total content of 0.1 to 4%, and most preferably at a total content of 0.2 to 3%.

Also effective is addition of a rare earth metal element, and in particular, Nd and/or Y to the Ag based alloy semi-reflective film and reflective film for the optical information recording medium of the present invention for improving the cohesion resistance and the heat resistance. However, when such rare earth element, and in particular, Nd and/or Y is added at a total content of less than 0.1%, further improvement in the cohesion resistance and the heat resistance is not attained. On the other hand, addition of such element in excess of 2% does not yield high reflectivity, high transmissivity, low absorptivity, and high thermal conductivity. Accordingly, such elements are added at a total content of 0.1 to 2%, preferably at 0.2 to 1%, and most preferably at 0.3 to 0.5%.

Also effective is addition of at least one element selected from Cu, Au, Rh, Pd, and Pt to the Ag based alloy semi-reflective film and reflective film for the optical information recording medium of the present invention for improving the corrosion resistance. However, when the at least one element selected from Cu, Au, Rh, Pd, and Pt is added at a total content of less than 0.1%, further improvement in the corrosion resistance and the heat resistance is not attained. On the other hand, addition of such element in excess of 3% does not yield high reflectivity, high transmissivity, low absorptivity, and high thermal conductivity. Accordingly, such elements are added at a total content of 0.1 to 3%, preferably at 0.2 to 2%, and most preferably at 0.3 to 1%.

It is to be noted that the Ag based alloy semi-reflective film for the optical information recording medium of the present invention is a thin film in a single side, multilayer optical disc which functions to enable transmission and reflection of the laser beam at the recording layer other than the recording layer located farthest from the side of the laser beam incidence, and this film may have a transmissivity of about 45 to 80% and a reflectivity of about 5 to 30%. The thickness may be any adequately determined so that the transmissivity and the reflectivity are within the predetermined range. The Ag based alloy semi-reflective film, however, may generally have a film thickness in the range of 5 to 25 nm.

It is to be noted that the Ag based alloy reflective film for the optical information recording medium of the present invention is a reflective film of a single side, single layer optical disc, or the reflective film in a single side, multilayer optical disc which is the farthest from the side of the laser beam incidence, and this film may have a reflectivity of about more than 50% and a transmissivity of substantially 0%. The thickness may be any adequately determined so that the reflectivity and the transmissivity are within the predetermined range. The Ag based alloy reflective film, however, may generally have a film thickness in the range of 50 to 250 nm.

The Ag based alloy semi-reflective film and reflective film for the optical information recording medium of the present invention is produced by depositing the Ag based alloy as described above on a substrate by various thin film deposition techniques such as vacuum deposition, ion plating, and sputtering, and the recommended is the one produced using the sputtering for the film deposition. Compared to the films formed by other thin film deposition techniques, the Ag based alloy semi-reflective film and reflective film formed by sputtering is superior in the alloy composition, distribution of the alloying elements, and uniformity of the film thickness in the film plane, and hence, in the performance as a semi-reflective film and reflective film (including the high reflectivity, the high transmissivity, the low absorptivity, the high thermal conductivity, high cohesion resistance, the highlight resistance, and the high heat resistance) enabling the production of an optical information recording medium having excellent writing/reading properties and long term reliability.

In the sputtering, a reflective film of desired alloy composition can be deposited by using a sputtering target (hereinafter simply referred as "target") comprising a Ag based alloy containing 0.05 to 4.5% of Bi together with 0.05 to 5% in total of at least one element selected from Zn, Al, Ga, In, Si, Ge, and Sn.

The Bi content in the target is higher than the Bi content in the reflective film since the amount of Bi in the resulting in the reflective film reduces to several to several dozen percents of the Bi that had been present in the target in the course of depositing the reflective layer by sputtering using the target comprising the Bi containing Ag based alloy. Such decrease is estimated to have been caused by re-evaporation of the Bi from the film surface in the course of the film deposition due to the substantial difference in the be melting point between the Ag and the Bi; difficulty of sputtering Bi due to higher sputtering rate of the Ag compared to that of the Bi; and oxidation of only Bi on the target surface due to higher reactivity of the Bi compared to the Ag. The substantial decrease of the Bi content of the reflective film from that of the target is a phenomenon that is not found in other Ag based alloy such as Ag-rare earth metal alloy. Accordingly, Bi content in the target should be increased compared to that of the Bi in the reflective layer to be deposited.

When a rare earth metal element, and in particular, Nd and/or Y is to be further added to the reflective film, or when at least one element selected from Cu, Au, Rh, Pd, and Pt is to be added to the reflective film, these elements may be added to the target. The rare earth element, and in particular, the Nd and/or Y may be added at a total content of 0.1 to 2%, preferably 0.2 to 1%, and more preferably 0.3 to 0.5%. The at least one element selected from Cu, Au, Rh, Pd, and Pt may be added at a total content of 0.1 to 3%, preferably at 0.2 to 2%, and more preferably at 0.3 to 1%.

The Ag based alloy sputtering target of the present invention can be produced by any method including melt casting, powder sintering, and spray depositing, and among these, the preferred is the one produced by vacuum melt casting since the Ag based alloy sputtering target produced by vacuum melt casting contains less nitrogen, oxygen, and other impurities, and the semi-reflective film and reflective film produced by using such sputtering target efficiently exhibits excellent properties (high reflectivity, high transmissivity, low absorptivity, high thermal conductivity, high cohesion resistance, high light resistance, and high heat resistance) to enable production of an optical information recording medium having excellent writing/reading properties and long term reliability.

The optical recording medium of the present invention is not particularly limited for its constitution as an optical information recording medium as long as it has the Ag based alloy semi-reflective film or the Ag based alloy reflective film of the present invention, and any constitution known in the field of the optical information recording medium may be employed. For example, the semi-reflective film or the reflective film comprising the Ag based alloy as described above are provided with high reflectivity, high transmissivity, low absorptivity, high thermal conductivity, high cohesion resistance, high light resistance, and high heat resistance, and therefore, these films are well adapted for use in the current read only, write-once, and rewritable optical information recording mediums as well as the next-generation, high storage capacity optical information recording medium.

EXAMPLES

The present invention is described in further detail by referring to the following experimental examples which by no means limit the scope of the present invention. Any modification of such examples without deviating the scope of the present invention is within the technical range of the present invention.

(1) Deposition of Thin Film

By using a pure Ag sputtering target (with the size of the diameter of 101.6 mm and the thickness of 5 mm), a composited sputtering target (with the size of the diameter of the diameter of 101.6 mm and the thickness of 5 mm) comprising the pure Ag sputtering target and a predetermined number of the chip (with the size of 5 mm×5 mm×the thickness of 1 mm) of an alloying element (Bi, Zn, Al, Ga, In, Si, Ge, Sn) disposed on the pure Ag sputtering target, or a Ag alloy sputtering target (with the size of the diameter of 101.6 mm and the thickness of 5 mm), a thin film was deposited on a polycarbonate substrate (with the diameter of 50 mm and the thickness of 1.0 mm) to a film thickness 15 nm (semi-reflective film) or 100 nm (reflective film) in a sputtering apparatus HSM-552 manufactured by Shimadzu Corporation by DC magnetron sputtering (base pressure, $0.27 \times 10^{-3}$ Pa or less; Ar gas pressure, 0.27 Pa; Ar gas flow rate, 30 sccm; sputtering power, DC 200 W; target-substrate distance, 52 mm; substrate temperature, room temperature). The thin films formed were films of Ag (Sample No. 1), Ag—Bi (Sample Nos. 2 to 5), Ag—Sn (Sample No. 6), Ag—Bi—Sn (Sample Nos. 7 to 11), Ag—Si (Sample No. 12), Ag—Bi—Si (Sample Nos. 13 to 17), Ag—In (Sample No. 18), Ag—Bi—In (Sample Nos. 19 to 23), Ag—Ga (Sample No. 24), Ag—Bi—Ga (Sample Nos. 25 to 29), Ag—Ge (Sample No. 30), Ag—Bi—Ge (Sample Nos. 31 to 35), Ag—Al (Sample No. 36), Ag—Bi—Al (Sample Nos. 37 to 41), Ag—Zn (Sample No. 42), Ag—Bi—Zn (Sample Nos. 43 to 47), Ag—Bi—Sn—Nd (Sample No. 48), Ag—Bi—Sn—Y (Sample No. 49), Ag—Bi—Sn—Cu (Sample No. 50), Ag—Bi—Sn—Au (Sample No. 51), Ag—Bi—Sn—Nd—Cu (Sample No. 52), Ag—Bi—Sn—Nd—Au (Sample No. 53), Ag—Bi—Sn—Y—Cu (Sample No. 54), Ag—Bi—Sn—Y—Au (Sample No. 55), Ag—Bi—Si—Nd (Sample No. 56), Ag—Bi—Si—Y (Sample No. 57), Ag—Bi—Si—Cu (Sample No. 58), Ag—Bi—Si—Au (Sample No. 59), Ag—Bi—Si—Nd—Cu (Sample No. 60), Ag—Bi—Si—Nd—Au (Sample No. 61), Ag—Bi—Si—Y—Cu (Sample No. 62), Ag—Bi—Si—Y—Au (Sample No. 63), Ag—Bi—In—Nd (Sample No. 64), Ag—Bi—In—Y (Sample No. 65), Ag—Bi—In—Cu (Sample No. 66), Ag—Bi—In—Au (Sample No. 67), Ag—Bi—In—Nd—Cu (Sample No. 68), Ag—Bi—In—Nd—Au (Sample No. 69), Ag—Bi—In—Y—Cu (Sample No. 70), Ag—Bi—In—Y—Au (Sample No. 71), Ag—Bi—Ga—Nd (Sample No. 72), Ag—Bi—Ga—Y (Sample No. 73), Ag—Bi—Ga—Cu (Sample No. 74), Ag—Bi—Ga—Au (Sample No. 75), Ag—Bi—Ga—Nd—Cu (Sample No. 76), Ag—Bi—Ga—Nd—Au (Sample No. 77), Ag—Bi—Ga—Y—Cu (Sample No. 78), Ag—Bi—Ga—Y—Au (Sample No. 79), Ag—Bi—Ge—Nd (Sample No. 80), Ag—Bi—Ge—Y (Sample No. 81), Ag—Bi—Ge—Cu (Sample No. 82), Ag—Bi—Ge—Au (Sample No. 83), Ag—Bi—Ge—Nd—Cu (Sample No. 84), Ag—Bi—Ge—Nd—Au (Sample No. 85), Ag—Bi—Ge—Y—Cu (Sample No. 86), Ag—Bi—Ge—Y—Au (Sample No. 87), Ag—Bi—Al—Nd (Sample No. 88), Ag—Bi—Al—Y (Sample No. 89), Ag—Bi—Al—Cu (Sample No. 90), Ag—Bi—Al—Au (Sample No. 91), Ag—Bi—Al—Nd—Cu (Sample No. 92), Ag—Bi—Al—Nd—Au (Sample No. 93), Ag—Bi—Al—Y—Cu (Sample No. 94), Ag—Bi—Al—Y—Au (Sample No. 95), Ag—Bi—Zn—Nd (Sample No. 96), Ag—Bi—Zn—Y (Sample No. 97), Ag—Bi—Zn—Cu (Sample No. 98), Ag—Bi—Zn—Au (Sample No. 99), and Ag—Bi—Zn—Nd—Cu (Sample No. 100), Ag—Bi—Zn—Nd—Au (Sample No. 101), Ag—Bi—Zn—Y—Cu (Sample No. 102), Ag—Bi—Zn—Y—Au (Sample No. 103).

(2) Analysis of the Film Composition

Of the thus deposited thin films, Ag alloy thin films (Sample Nos. 2 to 103) were analyzed for their film composition by inductively coupled plasma (ICP) mass spectroscopy. More specifically, analysis was conducted by dissolving the analyte Ag alloy thin film in an acidic solution (nitric acid:pure water=1:1), heating the acid solution on a hot plate of 200° C., cooling the solution to room temperature after confirming that all analyte sample had dissolved in the acid solution, and measuring the amount of alloying element in the Ag alloy thin film by using ICP mass spectometer SPQ-8000 manufactured by Seiko Instrument Inc. The film compositions of the samples (the results of the analysis) are shown in Tables 1 to 45 together with the results of the film structure analysis and evaluation of various properties as described below.

(3) Analysis of the Film Structure

The thus deposited thin films (Sample Nos. 1 to 103) were analyzed for the film structure by Rutherford Back Scattering Spectroscopy (RBS). More specifically, RBS spectrum was measured under the conditions including beam energy of 2300 keV, ion species of $He^+$, scattering angle of 170 degrees, electric current of the sample of 30 nA, and beam irradiation of 40 μC, and the measured spectrum and the simulated spectrum was fitted to evaluate the presence and the thickness of the alloying element rich layer at the top surface and/or the bottom interface. The results of the film structure analysis are shown in Tables 1 to 5. In Tables 1 to 5, the samples having an alloying element rich layer with a thickness of 5 angstroms or more are indicated "A", the samples having an alloying element rich layer with the thickness of less than 5 angstroms are indicated "B", and alloying element rich layer the samples having an alloying element rich layer are indicated "C". No alloying element rich layer was found in the Ag thin film (Sample No. 1). In contrast, an alloying element rich layer with a thickness of less than 5 angstroms was found in the Ag—Bi thin films (Sample Nos. 2 to 5), the Ag—Sn thin film (Sample No. 6), the Ag—Si thin film (Sample No. 12), the Ag—In thin film (Sample No. 18), the Ag—Ga thin film (Sample No. 24), the Ag—Ge thin film (Sample No. 30), the Ag—Al thin film (Sample No. 36), and the Ag—Zn thin film (Sample No. 42). An alloying element rich layer with a thickness of 5 angstroms or more was found in the Ag—Bi—(Zn, Al, Ga, In, Si, Ge, Sn) thin film having Bi added together with at least one element selected from Zn, Al, Ga, In, Si, Ge, and Sn (Sample Nos. 7 to 11, 13 to 17, 19 to 23, 25 to 29, 31 to 35, 37 to 41, and 43 to 47), and the Ag alloy thin films further having at least one element selected from Nd, Y, Cu, and Au added thereto (Sample Nos. 48 to 103), indicating the effect of the combined addition on the film formation. The effects of adding Rh, Pd, and Pt were equivalent to the addition of the Cu and Au.

Table 1

Table 2

Table 3

Table 4

Table 5

(4) Evaluation of Cohesion Resistance (Cohesion Caused by Heat)

The thus deposited thin films (Sample Nos. 1 to 103) were measured for average surface roughness Ra by using Nanoscope IIIa scanning probe microscope manufactured by Digital Instruments at AFM (Atomic Force Microscope) observation mode. These thin films were subjected to high temperature, high humidity test at a temperature of 80° C., a humidity of 90% RH, and a retention time of 48 hours, and the average surface roughness Ra was measured again after this test. The results of the evaluation for the cohesion resistance (cohesion caused by heat) are shown in Tables 6 to 10. In Tables 6 to 10, the sample with the change in the average roughness before and after the high temperature, high humidity test of less than 1.5 nm was regarded as the one having a high cohesion resistance, and such sample was evaluated as "A", and the sample with the change in the average roughness of 1.5 nm or more was regarded to have no such high cohesion resistance, and such sample was evaluated as "B". As demonstrated in Table 3, all Ag alloy thin films satisfying the requirements of the present invention (Sample Nos. 2 to 103) exhibited high cohesion resistance, and those not satisfying the requirements of the present invention, namely, the Ag thin film (Sample No. 1) failed to show the high cohesion resistance. The effects of adding Rh, Pd, and Pt were equivalent to the addition of the Cu and Au.

Table 6

Table 7

Table 8

Table 9

Table 10

(5) Evaluation of Cohesion Resistance (Cohesion Caused by a Halogen)

The thus deposited thin films (Sample Nos. 1 to 103) were measured for average surface roughness Ra by using Nanoscope IIIa scanning probe microscope manufactured by Digital Instruments at AFM (Atomic Force Microscope) observation mode. These thin films were subjected to salt water immersion test at a salt water concentration (NaCl concentration) of 0.05 mol/l, salt water temperature of 20° C., and immersion time of 5 minutes, and the average surface roughness Ra was measured again after this test. The results of the evaluation for the cohesion resistance (cohesion caused by a halogen) are shown in Tables 11 to 15. In Tables 11 to 15, the sample with the change in the average roughness before and after the salt water immersion test of less than 3 nm was regarded as the one having a high cohesion resistance, and such sample was evaluated as "A", and the sample with the change in the average roughness of 3 nm or more was regarded to have no such high cohesion resistance, and such sample was evaluated as "B". As demonstrated in Table 4, the Ag alloy thin films satisfying the requirements of the present invention (Sample Nos. 2 to 103) exhibited high cohesion resistance, and the Ag thin film (Sample No. 1) not satisfying the requirements of the present invention failed to show the high cohesion resistance. The effects of adding Rh, Pd, and Pt were equivalent to the addition of the Cu and Au.

Table 11

Table 12

Table 13

Table 14

Table 15

(6) Evaluation of Light Resistance

The samples wherein the thus deposited thin films (Sample Nos. 1 to 103) was overlaid with a UV curable resin film were subjected to UV/visible light irradiation test using Super Xenon Fading Apparatus SX75F manufactured by Suga Test Instruments Co., Ltd., wherein the samples were irradiated with UV/visible light at an irradiation illuminance of 120 W/m$^2$, an irradiation temperature of 80° C., and an irradiation time of 144 hours by a xenon arc lamp, and cross section of the tested samples was observed by TEM to evaluate diffusion/penetration of the Ag atom into the polycarbonate substrate or UV curable resin film. The results of the evaluation for the light resistance are shown in Tables 16 to 20. In Tables 16 to 20, the sample with Ag atom diffusion/penetration depth of less than 10 angstroms was regarded as the one having excellent light resistance, and such sample was evaluated as "A"; the sample with Ag atom diffusion/penetration depth of 10 angstroms or more and less than 30 angstroms was regarded to have high light resistance, and such sample was evaluated as "B"; and the sample with Ag atom diffusion/penetration depth of 30 angstrom or more was regarded to have no such light resistance, and such sample was evaluated as "C". The Ag thin film (Sample No. 1) did not show high light resistance. In contrast, the Ag—Bi thin films (Sample Nos. 2 to 5), the Ag—Sn thin film (Sample No. 6), the Ag—Si thin film (Sample No. 12), the Ag—In thin film (Sample No. 18), the Ag—Ga thin film (Sample No. 24), the Ag—Ge thin film (Sample No. 30), the Ag—Al thin film (Sample No. 36), and the Ag—Zn thin film (Sample No. 42) showed high light resistance due to the presence of the alloying element rich layer (with a thickness of less than 5 angstroms) which suppress diffusion and penetration of the Ag atom. The Ag—Bi—(Zn, Al, Ga, In, Si, Ge, Sn) thin films having Bi added together with at least one element selected from Zn, Al, Ga, In, Si, Ge, and Sn (Sample Nos. 7 to 11, 13 to 17, 19 to 23, 25 to 29, 31 to 35, 37 to 41, and 43 to 47), and the Ag alloy thin films further having at least one element selected from Nd, Y, Cu, and Au added thereto (Sample Nos. 48 to 103) exhibited excellent light resistance due to the presence of the alloying element rich layer with a thickness of 5 angstroms or more, indicating the effect of the combined addition on the film formation. The effects of adding Rh, Pd, and Pt were equivalent to the addition of the Cu and Au.

Table 16

Table 17

Table 18

Table 19

Table 20

(7) Evaluation of Heat Resistance

The thus deposited thin films (Sample Nos. 1 to 103) were measured for average surface roughness Ra by using Nanoscope IIIa scanning probe microscope manufactured by Digital Instruments at AFM (Atomic Force Microscope) observation mode. These thin films were subjected to vacuum heating test at a vacuum of $0.27 \times 10^{-3}$ Pa or less, a temperature of 300° C., and a retention time of 0.5 hour using a heat treatment apparatus in rotary magnetic field manufactured by Naruse Scientific Machines, and the average surface roughness Ra was measured again after this test. The results of the evaluation for the heat resistance are shown in Tables 21 to 25. In Tables 21 to 25, the sample with change in the average roughness before and after the vacuum heating test of less than 1.5 nm was regarded as the one having an excellent heat resistance, and such sample was evaluated "A", the sample with the change in the average roughness of not less than 1.5 nm to less than 3.0 nm was regarded as the one having a high heat resistance, and such sample was evaluated as "B", and the sample with the change in the average roughness of 3.0 nm or higher was regarded as the one not having the high heat resistance, and such sample was regarded as "C". The Ag thin film (Sample No. 1) did not show high heat resistance. In contrast, the Ag—Bi thin films (Sample Nos. 2 to 5), the Ag—Sn thin film (Sample No. 6), the Ag—Si thin film (Sample No. 12), the Ag—In thin film (Sample No. 18), the Ag—Ga thin film (Sample No. 24), the Ag—Ge thin film (Sample No. 30), the Ag—Al thin film (Sample No. 36), the Ag—Zn thin film (Sample No. 42) showed high heat resistance due to the presence of the alloying element rich layer (with a thickness of less than 5 angstroms) which suppress the Ag diffusion. The Ag—Bi—(Zn, Al, Ga, In, Si, Ge, Sn) thin films having Bi added together with at least one element selected from Zn, Al, Ga, In, Si, Ge, and Sn (Sample Nos. 7 to 11, 13 to 17, 19 to 23, 25 to 29, 31 to 35, 37 to 41, and 43 to 47), and the Ag alloy thin films further having at least one element selected from Nd, Y, Cu, and Au added thereto (Sample Nos. 48 to 103) exhibited excellent heat resistance due to the presence of the alloying element rich layer with a thickness of 5 angstroms or more, indicating the effect of the combined addition on the film formation. The effects of adding Rh, Pd, and Pt were equivalent to the addition of the Cu and Au.

Table 21

Table 22

Table 23

Table 24

Table 205

(8) Evaluation of Reflectivity, Transmissivity, and Absorptivity

The thus deposited thin films (Sample Nos. 1 to 103) were measured for spectral reflectivity and spectral transmissivity at a wavelength of 400 to 800 nm by using UV-Vis-NIR spectrophotometer V-570DS manufactured by JASCO, and absorptivity (=100%−(reflectivity+transmissivity)) was calculated from the thus measured reflectivity and the transmissivity. The results of the evaluation for the reflectivity, the transmissivity, and the absorptivity for the laser beam with the wavelength of 405 nm used in Blu-ray Disc, HD DVD, and the like are shown in Tables 26 to 30, Tables 31 to 35, and Tables 36 to 40. In Tables 26 to 40, the sample having a reflectivity of 15% or more, a transmissivity of 60% or more, and an absorptivity of less than 25% in relation to the reflectivity of 18%, the transmissivity of 68%, and the absorptivity of 14% of the pure Ag was regarded as the one having excellent optical properties, and such sample was evaluated "A", and the sample having a reflectivity of less than 15%, a transmissivity of less than 60%, and an absorptivity 25% or more was regarded as the one not having the excellent optical properties, and such sample was regarded as "B". The Ag—0.6% Bi thin film (Sample No. 5), the Ag—0.1% Bi—7% Sn thin film (Sample No. 11), the Ag—0.1% Bi—7% Si thin film (Sample No. 17), the Ag—0.1% Bi—7% In thin film (Sample No. 23), the Ag—0.1% Bi—7% Ga thin film (Sample No. 29), the Ag—0.1% Bi—7% Ge thin film (Sample No. 35), the Ag—0.1% Bi—7% Al thin film (Sample No. 41), and the Ag—0.1% Bi—7% Zn thin film (Sample No. 47) did not show high reflectivity, high transmissivity, and low absorptivity due to the high content of the Zn, Al, Ga, In, Si, Ge, or Sn. In contrast, the Ag thin film (Sample No. 1), the Ag—Bi thin films (Sample Nos. 2 to 4), the Ag—Sn thin film (Sample No. 6), the Ag—Bi—Sn thin films (Sample Nos. 7 to 10), the Ag—Si thin film (Sample No. 12), the Ag—Bi—Si thin films (Sample Nos. 13 to 16), the Ag—In thin film (Sample No. 18), the Ag—Bi—In thin films (Sample Nos. 19 to 22), the Ag—Ga thin film (Sample No. 24), the Ag—Bi—Ga thin films (Sample Nos. 25 to 28), the Ag—Ge thin film (Sample No. 30), the Ag—Bi—Ge thin films (Sample Nos. 31 to 34), the Ag—Al thin film (Sample No. 36), the Ag—Bi—Al thin films (Sample Nos. 37 to 40), the Ag—Zn thin film (Sample No. 42), and the Ag—Bi—Zn thin films (Sample Nos. 43 to 46), and the Ag alloy thin films further having at least one element selected from Nd, Y, Cu, and Au added thereto (Sample Nos. 48 to 103) exhibited high reflectivity, high transmissivity, and low absorptivity. The effects of adding Rh, Pd, and Pt were equivalent to the addition of the Cu and Au.

Table 26

Table 27

Table 28

Table 29

Table 30

Table 31

Table 32

Table 33

Table 34

Table 35

Table 36

Table 37

Table 38

Table 39

Table 40

(9) Evaluation of Thermal Conductivity

The thus deposited thin films (Sample Nos. 1 to 103) were measured for thermal conductivity by the procedure as described below. Namely, thermal conductivity was determined by measuring the sheet resistance Rs by DC four-probe technique using 3226 mΩ Hi TESTER manufactured by HIOKI E. E. CORPORATION; measuring film thickness t using alpha-step 250 manufactured by TENCOR INSTRUMENTS; calculating electrical resistivity ρ (μΩcm) by ρ=sheet resistance Rs×film thickness t; and then, calculating thermal conductivity κ (W/(m·K)) at an absolute temperature 300K (ca. 27° C.) by Wiedemann-Franz law by κ=2.51× absolute temperature T/electrical resistivity ρ. The results of the evaluation for the thermal conductivity are shown in Tables 41 to 45. In Tables 41 to 45, the sample having a thermal conductivity of not less than 160 W/(m·K) corresponding not less than 50% of the 320 W/(m·K), the thermal conductivity of the pure Ag thin film, was regarded as the one having excellent thermal conductivity, and such sample was evaluated "A", and the sample having a thermal conductivity of less than 160 W/(m·K) was regarded as the one not having the excellent thermal conductivity, and such sample was regarded as "B". The Ag—0.6% Bi thin film (Sample No. 5), the Ag—0.1% Bi—7% Sn thin film (Sample No. 11), the Ag—0.1% Bi—7% Si thin film (Sample No. 17), the Ag—0.1% Bi—7% In thin film (Sample No. 23), the Ag—0.1% Bi—7% Ga thin film (Sample No. 29), the Ag—0.1% Bi—7% Ge thin film (Sample No. 35), the Ag—0.1% Bi—7% Al thin film (Sample No. 41), and the Ag—0.1% Bi—7% Zn thin film (Sample No. 47) did not show high thermal conductivity due to the high content of the Zn, Al, Ga, In, Si, Ge, or Sn. In contrast, the Ag thin film (Sample No. 1), the Ag—Bi thin films (Sample Nos. 2 to 4), the Ag—Sn thin film (Sample No. 6), the Ag—Bi—Sn thin films (Sample Nos. 7 to 10), the Ag—Si thin film (Sample No. 12), the Ag—Bi—Si thin films (Sample Nos. 13 to 16), the Ag—In thin film (Sample No. 18), the Ag—Bi—In thin films (Sample Nos. 19 to 22), the Ag—Ga thin film (Sample No. 24), the Ag—Bi—Ga thin films (Sample Nos. 25 to 28), the Ag—Ge thin film (Sample No. 30), the Ag—Bi—Ge thin films (Sample Nos. 31 to 34), Ag—Al thin film (Sample No.

36), Ag—Bi—Al thin films (Sample Nos. 37 to 40), Ag—Zn thin film (Sample No. 42), Ag—Bi—Zn thin films (Sample Nos. 43 to 46), and the Ag alloy thin films further having at least one element selected from Nd, Y, Cu, and Au added thereto (Sample Nos. 48 to 103) exhibited high thermal conductivity.

Table 41

Table 42

Table 43

Table 44

Table 45

TABLE 1

| Sample No. | Film composition | Thickness of the alloying element rich layer, angstrom | Film structure |
|---|---|---|---|
| 1 | Ag | No alloying element rich layer | C |
| 2 | Ag—0.005% Bi | 1.3 | B |
| 3 | Ag—0.1% Bi | 1.7 | B |
| 4 | Ag—0.4% Bi | 2.8 | B |
| 5 | Ag—0.6% Bi | 3.6 | B |
| 6 | Ag—3% Sn | 1.4 | B |
| 7 | Ag—0.1% Bi—0.01% Sn | 5.4 | A |
| 8 | Ag—0.1% Bi—0.05% Sn | 5.5 | A |
| 9 | Ag—0.1% Bi—3% Sn | 6.4 | A |
| 10 | Ag—0.1% Bi—5% Sn | 6.7 | A |
| 11 | Ag—0.1% Bi—7% Sn | 7.1 | A |
| 12 | Ag—3% Si | 1.6 | B |
| 13 | Ag—0.1% Bi—0.01% Si | 5.6 | A |
| 14 | Ag—0.1% Bi—0.05% Si | 5.7 | A |
| 15 | Ag—0.1% Bi—3% Si | 8.1 | A |
| 16 | Ag—0.1% Bi—5% Si | 8.4 | A |
| 17 | Ag—0.1% Bi—7% Si | 8.8 | A |

TABLE 2

| Sample No. | Film composition | Thickness of the alloying element rich layer, angstrom | Film structure |
|---|---|---|---|
| 18 | Ag—3% In | 1.4 | B |
| 19 | Ag—0.1% Bi—0.01% In | 5.5 | A |
| 20 | Ag—0.1% Bi—0.05% In | 5.6 | A |
| 21 | Ag—0.1% Bi—3% In | 7.1 | A |
| 22 | Ag—0.1% Bi—5% In | 7.4 | A |
| 23 | Ag—0.1% Bi—7% In | 7.8 | A |
| 24 | Ag—3% Ga | 1.3 | B |
| 25 | Ag—0.1% Bi—0.01% Ga | 5.5 | A |
| 26 | Ag—0.1% Bi—0.05% Ga | 5.6 | A |
| 27 | Ag—0.1% Bi—3% Ga | 6.0 | A |
| 28 | Ag—0.1% Bi—5% Ga | 6.3 | A |
| 29 | Ag—0.1% Bi—7% Ga | 6.7 | A |
| 30 | Ag—3% Ge | 1.3 | B |
| 31 | Ag—0.1% Bi—0.01% Ge | 5.3 | A |
| 32 | Ag—0.1% Bi—0.05% Ge | 5.4 | A |
| 33 | Ag—0.1% Bi—3% Ge | 5.6 | A |
| 34 | Ag—0.1% Bi—5% Ge | 5.9 | A |
| 35 | Ag—0.1% Bi—7% Ge | 6.3 | A |

TABLE 3

| Sample No. | Film composition | Thickness of the alloying element rich layer, angstrom | Film structure |
|---|---|---|---|
| 36 | Ag—3% Al | 1.2 | B |
| 37 | Ag—0.1% Bi—0.01% Al | 5.3 | A |
| 38 | Ag—0.1% Bi—0.05% Al | 5.4 | A |
| 39 | Ag—0.1% Bi—3% Al | 5.6 | A |
| 40 | Ag—0.1% Bi—5% Al | 5.9 | A |
| 41 | Ag—0.1% Bi—7% Al | 6.3 | A |
| 42 | Ag—3% Zn | 1.2 | B |
| 43 | Ag—0.1% Bi—0.01% Zn | 5.2 | A |
| 44 | Ag—0.1% Bi—0.05% Zn | 5.3 | A |
| 45 | Ag—0.1% Bi—3% Zn | 5.5 | A |
| 46 | Ag—0.1% Bi—5% Zn | 5.8 | A |
| 47 | Ag—0.1% Bi—7% Zn | 6.2 | A |
| 48 | Ag—0.1% Bi—2% Sn—0.4% Nd | 6.3 | A |
| 49 | Ag—0.1% Bi—2% Sn—0.4% Y | 6.2 | A |
| 50 | Ag—0.1% Bi—2% Sn—0.5% Cu | 6.3 | A |
| 51 | Ag—0.1% Bi—2% Sn—0.5% Au | 6.1 | A |
| 52 | Ag—0.1% Bi—2% Sn—0.4% Nd—0.5% Cu | 6.4 | A |
| 53 | Ag—0.1% Bi—2% Sn—0.4% Nd—0.5% Au | 6.3 | A |
| 54 | Ag—0.1% Bi—2% Sn—0.4% Y—0.5% Cu | 6.3 | A |
| 55 | Ag—0.1% Bi—2% Sn—0.4% Y—0.5% Au | 6.2 | A |

TABLE 4

| Sample No. | Film composition | Thickness of the alloying element rich layer, angstrom | Film structure |
|---|---|---|---|
| 56 | Ag—0.1% Bi—2% Si—0.4% Nd | 7.9 | A |
| 57 | Ag—0.1% Bi—2% Si—0.4% Y | 7.8 | A |
| 58 | Ag—0.1% Bi—2% Si—0.5% Cu | 7.9 | A |
| 59 | Ag—0.1% Bi—2% Si—0.5% Au | 7.7 | A |
| 60 | Ag—0.1% Bi—2% Si—0.4% Nd—0.5% Cu | 8.0 | A |
| 61 | Ag—0.1% Bi—2% Si—0.4% Nd—0.5% Au | 7.9 | A |
| 62 | Ag—0.1% Bi—2% Si—0.4% Y—0.5% Cu | 7.9 | A |
| 63 | Ag—0.1% Bi—2% Si—0.4% Y—0.5% Au | 7.8 | A |
| 64 | Ag—0.1% Bi—2% In—0.4% Nd | 6.9 | A |
| 65 | Ag—0.1% Bi—2% In—0.4% Y | 6.8 | A |
| 66 | Ag—0.1% Bi—2% In—0.5% Cu | 6.9 | A |
| 67 | Ag—0.1% Bi—2% In—0.5% Au | 6.7 | A |
| 68 | Ag—0.1% Bi—2% In—0.4% Nd—0.5% Cu | 7.0 | A |
| 69 | Ag—0.1% Bi—2% In—0.4% Nd—0.5% Au | 6.9 | A |
| 70 | Ag—0.1% Bi—2% In—0.4% Y—0.5% Cu | 6.9 | A |
| 71 | Ag—0.1% Bi—2% In—0.4% Y—0.5% Au | 6.8 | A |
| 72 | Ag—0.1% Bi—2% Ga—0.4% Nd | 5.8 | A |
| 73 | Ag—0.1% Bi—2% Ga—0.4% Y | 5.7 | A |
| 74 | Ag—0.1% Bi—2% Ga—0.5% Cu | 5.8 | A |
| 75 | Ag—0.1% Bi—2% Ga—0.5% Au | 5.6 | A |
| 76 | Ag—0.1% Bi—2% Ga—0.4% Nd—0.5% Cu | 5.9 | A |
| 77 | Ag—0.1% Bi—2% Ga—0.4% Nd—0.5% Au | 5.8 | A |
| 78 | Ag—0.1% Bi—2% Ga—0.4% Y—0.5% Cu | 5.8 | A |
| 79 | Ag—0.1% Bi—2% Ga—0.4% Y—0.5% Au | 5.7 | A |

TABLE 5

| Sample No. | Film composition | Thickness of the alloying element rich layer, angstrom | Film structure |
|---|---|---|---|
| 80 | Ag—0.1% Bi—2% Ge—0.4% Nd | 5.4 | A |
| 81 | Ag—0.1% Bi—2% Ge—0.4% Y | 5.3 | A |
| 82 | Ag—0.1% Bi—2% Ge—0.5% Cu | 5.4 | A |

TABLE 5-continued

| Sample No. | Film composition | Thickness of the alloying element rich layer, angstrom | Film structure |
|---|---|---|---|
| 83 | Ag—0.1% Bi—2% Ge—0.5% Au | 5.2 | A |
| 84 | Ag—0.1% Bi—2% Ge—0.4% Nd—0.5% Cu | 5.5 | A |
| 85 | Ag—0.1% Bi—2% Ge—0.4% Nd—0.5% Au | 5.4 | A |
| 86 | Ag—0.1% Bi—2% Ge—0.4% Y—0.5% Cu | 5.4 | A |
| 87 | Ag—0.1% Bi—2% Ge—0.4% Y—0.5% Au | 5.3 | A |
| 88 | Ag—0.1% Bi—2% Al—0.4% Nd | 5.4 | A |
| 89 | Ag—0.1% Bi—2% Al—0.4% Y | 5.3 | A |
| 90 | Ag—0.1% Bi—2% Al—0.5% Cu | 5.4 | A |
| 91 | Ag—0.1% Bi—2% Al—0.5% Au | 5.2 | A |
| 92 | Ag—0.1% Bi—2% Al—0.4% Nd—0.5% Cu | 5.5 | A |
| 93 | Ag—0.1% Bi—2% Al—0.4% Nd—0.5% Au | 5.4 | A |
| 94 | Ag—0.1% Bi—2% Al—0.4% Y—0.5% Cu | 5.4 | A |
| 95 | Ag—0.1% Bi—2% Al—0.4% Y—0.5% Au | 5.3 | A |
| 96 | Ag—0.1% Bi—2% Zn—0.4% Nd | 5.3 | A |
| 97 | Ag—0.1% Bi—2% Zn—0.4% Y | 5.2 | A |
| 98 | Ag—0.1% Bi—2% Zn—0.5% Cu | 5.3 | A |
| 99 | Ag—0.1% Bi—2% Zn—0.5% Au | 5.1 | A |
| 100 | Ag—0.1% Bi—2% Zn—0.4% Nd—0.5% Cu | 5.4 | A |
| 101 | Ag—0.1% Bi—2% Zn—0.4% Nd—0.5% Au | 5.3 | A |
| 102 | Ag—0.1% Bi—2% Zn—0.4% Y—0.5% Cu | 5.3 | A |
| 103 | Ag—0.1% Bi—2% Zn—0.4% Y—0.5% Au | 5.2 | A |

TABLE 6

| Sample No. | Film composition | Change in average surface roughness, nm | Cohesion resistance caused by heat |
|---|---|---|---|
| 1 | Ag | 3.0 | B |
| 2 | Ag—0.005% Bi | 0.5 | A |
| 3 | Ag—0.1% Bi | 0.4 | A |
| 4 | Ag—0.4% Bi | 0.3 | A |
| 5 | Ag—0.6% Bi | 0.3 | A |
| 6 | Ag—3% Sn | 1.0 | A |
| 7 | Ag—0.1% Bi—0.01% Sn | 0.3 | A |
| 8 | Ag—0.1% Bi—0.05% Sn | 0.3 | A |
| 9 | Ag—0.1% Bi—3% Sn | 0.2 | A |
| 10 | Ag—0.1% Bi—5% Sn | 0.2 | A |
| 11 | Ag—0.1% Bi—7% Sn | 0.2 | A |
| 12 | Ag—3% Si | 0.9 | A |
| 13 | Ag—0.1% Bi—0.01% Si | 0.3 | A |
| 14 | Ag—0.1% Bi—0.05% Si | 0.3 | A |
| 15 | Ag—0.1% Bi—3% Si | 0.2 | A |
| 16 | Ag—0.1% Bi—5% Si | 0.2 | A |
| 17 | Ag—0.1% Bi—7% Si | 0.2 | A |

TABLE 7

| Sample No. | Film composition | Change in average surface roughness, nm | Cohesion resistance caused by heat |
|---|---|---|---|
| 18 | Ag—3% In | 0.9 | A |
| 19 | Ag—0.1% Bi—0.01% In | 0.3 | A |
| 20 | Ag—0.1% Bi—0.05% In | 0.3 | A |
| 21 | Ag—0.1% Bi—3% In | 0.2 | A |
| 22 | Ag—0.1% Bi—5% In | 0.2 | A |
| 23 | Ag—0.1% Bi—7% In | 0.2 | A |
| 24 | Ag—3% Ga | 1.1 | A |
| 25 | Ag—0.1% Bi—0.01% Ga | 0.3 | A |
| 26 | Ag—0.1% Bi—0.05% Ga | 0.3 | A |
| 27 | Ag—0.1% Bi—3% Ga | 0.2 | A |
| 28 | Ag—0.1% Bi—5% Ga | 0.2 | A |
| 29 | Ag—0.1% Bi—7% Ga | 0.2 | A |
| 30 | Ag—3% Ge | 1.1 | A |
| 31 | Ag—0.1% Bi—0.01% Ge | 0.3 | A |
| 32 | Ag—0.1% Bi—0.05% Ge | 0.3 | A |
| 33 | Ag—0.1% Bi—3% Ge | 0.2 | A |
| 34 | Ag—0.1% Bi—5% Ge | 0.2 | A |
| 35 | Ag—0.1% Bi—7% Ge | 0.2 | A |

TABLE 8

| Sample No. | Film composition | Change in average surface roughness, nm | Cohesion resistance caused by heat |
|---|---|---|---|
| 36 | Ag—3% Al | 1.2 | A |
| 37 | Ag—0.1% Bi—0.01% Al | 0.3 | A |
| 38 | Ag—0.1% Bi—0.05% Al | 0.3 | A |
| 39 | Ag—0.1% Bi—3% Al | 0.2 | A |
| 40 | Ag—0.1% Bi—5% Al | 0.2 | A |
| 41 | Ag—0.1% Bi—7% Al | 0.2 | A |
| 42 | Ag—3% Zn | 1.2 | A |
| 43 | Ag—0.1% Bi—0.01% Zn | 0.3 | A |
| 44 | Ag—0.1% Bi—0.05% Zn | 0.3 | A |
| 45 | Ag—0.1% Bi—3% Zn | 0.2 | A |
| 46 | Ag—0.1% Bi—5% Zn | 0.2 | A |
| 47 | Ag—0.1% Bi—7% Zn | 0.2 | A |
| 48 | Ag—0.1% Bi—2% Sn—0.4% Nd | 0.1 | A |
| 49 | Ag—0.1% Bi—2% Sn—0.4% Y | 0.1 | A |
| 50 | Ag—0.1% Bi—2% Sn—0.5% Cu | 0.2 | A |
| 51 | Ag—0.1% Bi—2% Sn—0.5% Au | 0.2 | A |
| 52 | Ag—0.1% Bi—2% Sn—0.4% Nd—0.5% Cu | 0.1 | A |
| 53 | Ag—0.1% Bi—2% Sn—0.4% Nd—0.5% Au | 0.1 | A |
| 54 | Ag—0.1% Bi—2% Sn—0.4% Y—0.5% Cu | 0.1 | A |
| 55 | Ag—0.1% Bi—2% Sn—0.4% Y—0.5% Au | 0.1 | A |

TABLE 9

| Sample No. | Film composition | Change in average surface roughness, nm | Cohesion resistance caused by heat |
|---|---|---|---|
| 56 | Ag—0.1% Bi—2% Si—0.4% Nd | 0.1 | A |
| 57 | Ag—0.1% Bi—2% Si—0.4% Y | 0.1 | A |
| 58 | Ag—0.1% Bi—2% Si—0.5% Cu | 0.2 | A |
| 59 | Ag—0.1% Bi—2% Si—0.5% Au | 0.2 | A |
| 60 | Ag—0.1% Bi—2% Si—0.4% Nd—0.5% Cu | 0.1 | A |
| 61 | Ag—0.1% Bi—2% Si—0.4% Nd—0.5% Au | 0.1 | A |
| 62 | Ag—0.1% Bi—2% Si—0.4% Y—0.5% Cu | 0.1 | A |
| 63 | Ag—0.1% Bi—2% Si—0.4% Y—0.5% Au | 0.1 | A |
| 64 | Ag—0.1% Bi—2% In—0.4% Nd | 0.1 | A |
| 65 | Ag—0.1% Bi—2% In—0.4% Y | 0.1 | A |
| 66 | Ag—0.1% Bi—2% In—0.5% Cu | 0.2 | A |
| 67 | Ag—0.1% Bi—2% In—0.5% Au | 0.2 | A |
| 68 | Ag—0.1% Bi—2% In—0.4% Nd—0.5% Cu | 0.1 | A |
| 69 | Ag—0.1% Bi—2% In—0.4% Nd—0.5% Au | 0.1 | A |
| 70 | Ag—0.1% Bi—2% In—0.4% Y—0.5% Cu | 0.1 | A |
| 71 | Ag—0.1% Bi—2% In—0.4% Y—0.5% Au | 0.1 | A |
| 72 | Ag—0.1% Bi—2% Ga—0.4% Nd | 0.1 | A |
| 73 | Ag—0.1% Bi—2% Ga—0.4% Y | 0.1 | A |
| 74 | Ag—0.1% Bi—2% Ga—0.5% Cu | 0.2 | A |
| 75 | Ag—0.1% Bi—2% Ga—0.5% Au | 0.2 | A |
| 76 | Ag—0.1% Bi—2% Ga—0.4% Nd—0.5% Cu | 0.1 | A |
| 77 | Ag—0.1% Bi—2% Ga—0.4% Nd—0.5% Au | 0.1 | A |

TABLE 9-continued

| Sample No. | Film composition | Change in average surface roughness, nm | Cohesion resistance caused by heat |
|---|---|---|---|
| 78 | Ag—0.1% Bi—2% Ga—0.4% Y—0.5% Cu | 0.1 | A |
| 79 | Ag—0.1% Bi—2% Ga—0.4% Y—0.5% Au | 0.1 | A |

TABLE 10

| Sample No. | Film composition | Change in average surface roughness, nm | Cohesion resistance caused by heat |
|---|---|---|---|
| 80 | Ag—0.1% Bi—2% Ge—0.4% Nd | 0.1 | A |
| 81 | Ag—0.1% Bi—2% Ge—0.4% Y | 0.1 | A |
| 82 | Ag—0.1% Bi—2% Ge—0.5% Cu | 0.2 | A |
| 83 | Ag—0.1% Bi—2% Ge—0.5% Au | 0.2 | A |
| 84 | Ag—0.1% Bi—2% Ge—0.4% Nd—0.5% Cu | 0.1 | A |
| 85 | Ag—0.1% Bi—2% Ge—0.4% Nd—0.5% Au | 0.1 | A |
| 86 | Ag—0.1% Bi—2% Ge—0.4% Y—0.5% Cu | 0.1 | A |
| 87 | Ag—0.1% Bi—2% Ge—0.4% Y—0.5% Au | 0.1 | A |
| 88 | Ag—0.1% Bi—2% Al—0.4% Nd | 0.1 | A |
| 89 | Ag—0.1% Bi—2% Al—0.4% Y | 0.1 | A |
| 90 | Ag—0.1% Bi—2% Al—0.5% Cu | 0.2 | A |
| 91 | Ag—0.1% Bi—2% Al—0.5% Au | 0.2 | A |
| 92 | Ag—0.1% Bi—2% Al—0.4% Nd—0.5% Cu | 0.1 | A |
| 93 | Ag—0.1% Bi—2% Al—0.4% Nd—0.5% Au | 0.1 | A |
| 94 | Ag—0.1% Bi—2% Al—0.4% Y—0.5% Cu | 0.1 | A |
| 95 | Ag—0.1% Bi—2% Al—0.4% Y—0.5% Au | 0.1 | A |
| 96 | Ag—0.1% Bi—2% Zn—0.4% Nd | 0.1 | A |
| 97 | Ag—0.1% Bi—2% Zn—0.4% Y | 0.1 | A |
| 98 | Ag—0.1% Bi—2% Zn—0.5% Cu | 0.2 | A |
| 99 | Ag—0.1% Bi—2% Zn—0.5% Au | 0.2 | A |
| 100 | Ag—0.1% Bi—2% Zn—0.4% Nd—0.5% Cu | 0.1 | A |
| 101 | Ag—0.1% Bi—2% Zn—0.4% Nd—0.5% Au | 0.1 | A |
| 102 | Ag—0.1% Bi—2% Zn—0.4% Y—0.5% Cu | 0.1 | A |
| 103 | Ag—0.1% Bi—2% Zn—0.4% Y—0.5% Au | 0.1 | A |

TABLE 11

| Sample No. | Film composition | Change in average surface roughness, nm | Cohesion resistance caused by a halogen |
|---|---|---|---|
| 1 | Ag | 10.8 | B |
| 2 | Ag—0.005% Bi | 0.6 | A |
| 3 | Ag—0.1% Bi | 0.4 | A |
| 4 | Ag—0.4% Bi | 0.3 | A |
| 5 | Ag—0.6% Bi | 0.3 | A |
| 6 | Ag—3% Sn | 1.2 | A |
| 7 | Ag—0.1% Bi—0.01% Sn | 0.3 | A |
| 8 | Ag—0.1% Bi—0.05% Sn | 0.3 | A |
| 9 | Ag—0.1% Bi—3% Sn | 0.2 | A |
| 10 | Ag—0.1% Bi—5% Sn | 0.2 | A |
| 11 | Ag—0.1% Bi—7% Sn | 0.2 | A |
| 12 | Ag—3% Si | 1.0 | A |
| 13 | Ag—0.1% Bi—0.01% Si | 0.3 | A |
| 14 | Ag—0.1% Bi—0.05% Si | 0.3 | A |
| 15 | Ag—0.1% Bi—3% Si | 0.2 | A |
| 16 | Ag—0.1% Bi—5% Si | 0.2 | A |
| 17 | Ag—0.1% Bi—7% Si | 0.2 | A |

TABLE 12

| Sample No. | Film composition | Change in average surface roughness, nm | Cohesion resistance caused by a halogen |
|---|---|---|---|
| 18 | Ag—3% In | 1.1 | A |
| 19 | Ag—0.1% Bi—0.01% In | 0.3 | A |
| 20 | Ag—0.1% Bi—0.05% In | 0.3 | A |
| 21 | Ag—0.1% Bi—3% In | 0.2 | A |
| 22 | Ag—0.1% Bi—5% In | 0.2 | A |
| 23 | Ag—0.1% Bi—7% In | 0.2 | A |
| 24 | Ag—3% Ga | 1.3 | A |
| 25 | Ag—0.1% Bi—0.01% Ga | 0.3 | A |
| 26 | Ag—0.1% Bi—0.05% Ga | 0.3 | A |
| 27 | Ag—0.1% Bi—3% Ga | 0.2 | A |
| 28 | Ag—0.1% Bi—5% Ga | 0.2 | A |
| 29 | Ag—0.1% Bi—7% Ga | 0.2 | A |
| 30 | Ag—3% Ge | 1.4 | A |
| 31 | Ag—0.1% Bi—0.01% Ge | 0.3 | A |
| 32 | Ag—0.1% Bi—0.05% Ge | 0.3 | A |
| 33 | Ag—0.1% Bi—3% Ge | 0.2 | A |
| 34 | Ag—0.1% Bi—5% Ge | 0.2 | A |
| 35 | Ag—0.1% Bi—7% Ge | 0.2 | A |

TABLE 13

| Sample No. | Film composition | Change in average surface roughness, nm | Cohesion resistance caused by a halogen |
|---|---|---|---|
| 36 | Ag—3% Al | 1.6 | A |
| 37 | Ag—0.1% Bi—0.01% Al | 0.3 | A |
| 38 | Ag—0.1% Bi—0.05% Al | 0.3 | A |
| 39 | Ag—0.1% Bi—3% Al | 0.2 | A |
| 40 | Ag—0.1% Bi—5% Al | 0.2 | A |
| 41 | Ag—0.1% Bi—7% Al | 0.2 | A |
| 42 | Ag—3% Zn | 1.6 | A |
| 43 | Ag—0.1% Bi—0.01% Zn | 0.3 | A |
| 44 | Ag—0.1% Bi—0.05% Zn | 0.3 | A |
| 45 | Ag—0.1% Bi—3% Zn | 0.2 | A |
| 46 | Ag—0.1% Bi—5% Zn | 0.2 | A |
| 47 | Ag—0.1% Bi—7% Zn | 0.2 | A |
| 48 | Ag—0.1% Bi—2% Sn—0.4% Nd | 0.2 | A |
| 49 | Ag—0.1% Bi—2% Sn—0.4% Y | 0.2 | A |
| 50 | Ag—0.1% Bi—2% Sn—0.5% Cu | 0.1 | A |
| 51 | Ag—0.1% Bi—2% Sn—0.5% Au | 0.1 | A |
| 52 | Ag—0.1% Bi—2% Sn—0.4% Nd—0.5% Cu | 0.1 | A |
| 53 | Ag—0.1% Bi—2% Sn—0.4% Nd—0.5% Au | 0.1 | A |
| 54 | Ag—0.1% Bi—2% Sn—0.4% Y—0.5% Cu | 0.1 | A |
| 55 | Ag—0.1% Bi—2% Sn—0.4% Y—0.5% Au | 0.1 | A |

TABLE 14

| Sample No. | Film composition | Change in average surface roughness, nm | Cohesion resistance caused by a halogen |
|---|---|---|---|
| 56 | Ag—0.1% Bi—2% Si—0.4% Nd | 0.2 | A |
| 57 | Ag—0.1% Bi—2% Si—0.4% Y | 0.2 | A |
| 58 | Ag—0.1% Bi—2% Si—0.5% Cu | 0.1 | A |
| 59 | Ag—0.1% Bi—2% Si—0.5% Au | 0.1 | A |
| 60 | Ag—0.1% Bi—2% Si—0.4% Nd—0.5% Cu | 0.1 | A |
| 61 | Ag—0.1% Bi—2% Si—0.4% Nd—0.5% Au | 0.1 | A |
| 62 | Ag—0.1% Bi—2% Si—0.4% Y—0.5% Cu | 0.1 | A |
| 63 | Ag—0.1% Bi—2% Si—0.4% Y—0.5% Au | 0.1 | A |
| 64 | Ag—0.1% Bi—2% In—0.4% Nd | 0.2 | A |
| 65 | Ag—0.1% Bi—2% In—0.4% Y | 0.2 | A |
| 66 | Ag—0.1% Bi—2% In—0.5% Cu | 0.1 | A |
| 67 | Ag—0.1% Bi—2% In—0.5% Au | 0.1 | A |
| 68 | Ag—0.1% Bi—2% In—0.4% Nd—0.5% Cu | 0.1 | A |
| 69 | Ag—0.1% Bi—2% In—0.4% Nd—0.5% Au | 0.1 | A |
| 70 | Ag—0.1% Bi—2% In—0.4% Y—0.5% Cu | 0.1 | A |
| 71 | Ag—0.1% Bi—2% In—0.4% Y—0.5% Au | 0.1 | A |
| 72 | Ag—0.1% Bi—2% Ga—0.4% Nd | 0.2 | A |
| 73 | Ag—0.1% Bi—2% Ga—0.4% Y | 0.2 | A |
| 74 | Ag—0.1% Bi—2% Ga—0.5% Cu | 0.1 | A |
| 75 | Ag—0.1% Bi—2% Ga—0.5% Au | 0.1 | A |
| 76 | Ag—0.1% Bi—2% Ga—0.4% Nd—0.5% Cu | 0.1 | A |
| 77 | Ag—0.1% Bi—2% Ga—0.4% Nd—0.5% Au | 0.1 | A |
| 78 | Ag—0.1% Bi—2% Ga—0.4% Y—0.5% Cu | 0.1 | A |
| 79 | Ag—0.1% Bi—2% Ga—0.4% Y—0.5% Au | 0.1 | A |

TABLE 15

| Sample No. | Film composition | Change in average surface roughness, nm | Cohesion resistance caused by a halogen |
|---|---|---|---|
| 80 | Ag—0.1% Bi—2% Ge—0.4% Nd | 0.2 | A |
| 81 | Ag—0.1% Bi—2% Ge—0.4% Y | 0.2 | A |
| 82 | Ag—0.1% Bi—2% Ge—0.5% Cu | 0.1 | A |
| 83 | Ag—0.1% Bi—2% Ge—0.5% Au | 0.1 | A |
| 84 | Ag—0.1% Bi—2% Ge—0.4% Nd—0.5% Cu | 0.1 | A |
| 85 | Ag—0.1% Bi—2% Ge—0.4% Nd—0.5% Au | 0.1 | A |
| 86 | Ag—0.1% Bi—2% Ge—0.4% Y—0.5% Cu | 0.1 | A |
| 87 | Ag—0.1% Bi—2% Ge—0.4% Y—0.5% Au | 0.1 | A |
| 88 | Ag—0.1% Bi—2% Al—0.4% Nd | 0.2 | A |
| 89 | Ag—0.1% Bi—2% Al—0.4% Y | 0.2 | A |
| 90 | Ag—0.1% Bi—2% Al—0.5% Cu | 0.1 | A |
| 91 | Ag—0.1% Bi—2% Al—0.5% Au | 0.1 | A |

TABLE 15-continued

| Sample No. | Film composition | Change in average surface roughness, nm | Cohesion resistance caused by a halogen |
|---|---|---|---|
| 92 | Ag—0.1% Bi—2% Al—0.4% Nd—0.5% Cu | 0.1 | A |
| 93 | Ag—0.1% Bi—2% Al—0.4% Nd—0.5% Au | 0.1 | A |
| 94 | Ag—0.1% Bi—2% Al—0.4% Y—0.5% Cu | 0.1 | A |
| 95 | Ag—0.1% Bi—2% Al—0.4% Y—0.5% Au | 0.1 | A |
| 96 | Ag—0.1% Bi—2% Zn—0.4% Nd | 0.2 | A |
| 97 | Ag—0.1% Bi—2% Zn—0.4% Y | 0.2 | A |
| 98 | Ag—0.1% Bi—2% Zn—0.5% Cu | 0.1 | A |
| 99 | Ag—0.1% Bi—2% Zn—0.5% Au | 0.1 | A |
| 100 | Ag—0.1% Bi—2% Zn—0.4% Nd—0.5% Cu | 0.1 | A |
| 101 | Ag—0.1% Bi—2% Zn—0.4% Nd—0.5% Au | 0.1 | A |
| 102 | Ag—0.1% Bi—2% Zn—0.4% Y—0.5% Cu | 0.1 | A |
| 103 | Ag—0.1% Bi—2% Zn—0.4% Y—0.5% Au | 0.1 | A |

TABLE 16

| Sample No. | Film composition | Depth of diffusion or penetration of Ag atom, angstrom | Light resistance |
|---|---|---|---|
| 1 | Ag | 120 | C |
| 2 | Ag—0.005% Bi | 20 | B |
| 3 | Ag—0.1% Bi | 18 | B |
| 4 | Ag—0.4% Bi | 15 | B |
| 5 | Ag—0.6% Bi | 15 | B |
| 6 | Ag—3% Sn | 14 | B |
| 7 | Ag—0.1% Bi—0.01% Sn | No diffusion or penetration | A |
| 8 | Ag—0.1% Bi—0.05% Sn | No diffusion or penetration | A |
| 9 | Ag—0.1% Bi—3% Sn | No diffusion or penetration | A |
| 10 | Ag—0.1% Bi—5% Sn | No diffusion or penetration | A |
| 11 | Ag—0.1% Bi—7% Sn | No diffusion or penetration | A |
| 12 | Ag—3% Si | 13 | B |
| 13 | Ag—0.1% Bi—0.01% Si | No diffusion or penetration | A |
| 14 | Ag—0.1% Bi—0.05% Si | No diffusion or penetration | A |
| 15 | Ag—0.1% Bi—3% Si | No diffusion or penetration | A |
| 16 | Ag—0.1% Bi—5% Si | No diffusion or penetration | A |
| 17 | Ag—0.1% Bi—7% Si | No diffusion or penetration | A |

TABLE 17

| Sample No. | Film composition | Depth of diffusion or penetration of Ag atom, angstrom | Light resistance |
|---|---|---|---|
| 18 | Ag—3% In | 14 | B |
| 19 | Ag—0.1% Bi—0.01% In | No diffusion or penetration | A |
| 20 | Ag—0.1% Bi—0.05% In | No diffusion or penetration | A |
| 21 | Ag—0.1% Bi—3% In | No diffusion or penetration | A |
| 22 | Ag—0.1% Bi—5% In | No diffusion or penetration | A |
| 23 | Ag—0.1% Bi—7% In | No diffusion or penetration | A |
| 24 | Ag—3% Ga | 15 | B |
| 25 | Ag—0.1% Bi—0.01% Ga | No diffusion or penetration | A |
| 26 | Ag—0.1% Bi—0.05% Ga | No diffusion or penetration | A |
| 27 | Ag—0.1% Bi—3% Ga | No diffusion or penetration | A |
| 28 | Ag—0.1% Bi—5% Ga | No diffusion or penetration | A |
| 29 | Ag—0.1% Bi—7% Ga | No diffusion or penetration | A |
| 30 | Ag—3% Ge | 14 | B |
| 31 | Ag—0.1% Bi—0.01% Ge | No diffusion or penetration | A |
| 32 | Ag—0.1% Bi—0.05% Ge | No diffusion or penetration | A |
| 33 | Ag—0.1% Bi—3% Ge | No diffusion or penetration | A |
| 34 | Ag—0.1% Bi—5% Ge | No diffusion or penetration | A |
| 35 | Ag—0.1% Bi—7% Ge | No diffusion or penetration | A |

TABLE 18

| Sample No. | Film composition | Depth of diffusion or penetration of Ag atom, angstrom | Light resistance |
|---|---|---|---|
| 36 | Ag—3% Al | 15 | B |
| 37 | Ag—0.1% Bi—0.01% Al | No diffusion or penetration | A |
| 38 | Ag—0.1% Bi—0.05% Al | No diffusion or penetration | A |
| 39 | Ag—0.1% Bi—3% Al | No diffusion or penetration | A |
| 40 | Ag—0.1% Bi—5% Al | No diffusion or penetration | A |
| 41 | Ag—0.1% Bi—7% Al | No diffusion or penetration | A |
| 42 | Ag—3% Zn | 14 | B |
| 43 | Ag—0.1% Bi—0.01% Zn | No diffusion or penetration | A |
| 44 | Ag—0.1% Bi—0.05% Zn | No diffusion or penetration | A |
| 45 | Ag—0.1% Bi—3% Zn | No diffusion or penetration | A |
| 46 | Ag—0.1% Bi—5% Zn | No diffusion or penetration | A |
| 47 | Ag—0.1% Bi—7% Zn | No diffusion or penetration | A |
| 48 | Ag—0.1% Bi—2% Sn—0.4% Nd | No diffusion or penetration | A |
| 49 | Ag—0.1% Bi—2% Sn—0.4% Y | No diffusion or penetration | A |
| 50 | Ag—0.1% Bi—2% Sn—0.5% Cu | No diffusion or penetration | A |
| 51 | Ag—0.1% Bi—2% Sn—0.5% Au | No diffusion or penetration | A |
| 52 | Ag—0.1% Bi—2% Sn—0.4% Nd—0.5% Cu | No diffusion or penetration | A |
| 53 | Ag—0.1% Bi—2% Sn—0.4% Nd—0.5% Au | No diffusion or penetration | A |
| 54 | Ag—0.1% Bi—2% Sn—0.4% Y—0.5% Cu | No diffusion or penetration | A |
| 55 | Ag—0.1% Bi—2% Sn—0.4% Y—0.5% Au | No diffusion or penetration | A |

TABLE 19

| Sample No. | Film composition | Depth of diffusion or penetration of Ag atom, angstrom | Light resistance |
|---|---|---|---|
| 56 | Ag—0.1% Bi—2% Si—0.4% Nd | No diffusion or penetration | A |
| 57 | Ag—0.1% Bi—2% Si—0.4% Y | No diffusion or penetration | A |
| 58 | Ag—0.1% Bi—2% Si—0.5% Cu | No diffusion or penetration | A |
| 59 | Ag—0.1% Bi—2% Si—0.5% Au | No diffusion or penetration | A |
| 60 | Ag—0.1% Bi—2% Si—0.4% Nd—0.5% Cu | No diffusion or penetration | A |
| 61 | Ag—0.1% Bi—2% Si—0.4% Nd—0.5% Au | No diffusion or penetration | A |
| 62 | Ag—0.1% Bi—2% Si—0.4% Y—0.5% Cu | No diffusion or penetration | A |
| 63 | Ag—0.1% Bi—2% Si—0.4% Y—0.5% Au | No diffusion or penetration | A |
| 64 | Ag—0.1% Bi—2% In—0.4% Nd | No diffusion or penetration | A |
| 65 | Ag—0.1% Bi—2% In—0.4% Y | No diffusion or penetration | A |
| 66 | Ag—0.1% Bi—2% In—0.5% Cu | No diffusion or penetration | A |
| 67 | Ag—0.1% Bi—2% In—0.5% Au | No diffusion or penetration | A |
| 68 | Ag—0.1% Bi—2% In—0.4% Nd—0.5% Cu | No diffusion or penetration | A |
| 69 | Ag—0.1% Bi—2% In—0.4% Nd—0.5% Au | No diffusion or penetration | A |
| 70 | Ag—0.1% Bi—2% In—0.4% Y—0.5% Cu | No diffusion or penetration | A |
| 71 | Ag—0.1% Bi—2% In—0.4% Y—0.5% Au | No diffusion or penetration | A |
| 72 | Ag—0.1% Bi—2% Ga—0.4% Nd | No diffusion or penetration | A |
| 73 | Ag—0.1% Bi—2% Ga—0.4% Y | No diffusion or penetration | A |
| 74 | Ag—0.1% Bi—2% Ga—0.5% Cu | No diffusion or penetration | A |
| 75 | Ag—0.1% Bi—2% Ga—0.5% Au | No diffusion or penetration | A |
| 76 | Ag—0.1% Bi—2% Ga—0.4% Nd—0.5% Cu | No diffusion or penetration | A |
| 77 | Ag—0.1% Bi—2% Ga—0.4% Nd—0.5% Au | No diffusion or penetration | A |
| 78 | Ag—0.1% Bi—2% Ga—0.4% Y—0.5% Cu | No diffusion or penetration | A |
| 79 | Ag—0.1% Bi—2% Ga—0.4% Y—0.5% Au | No diffusion or penetration | A |

TABLE 20

| Sample No. | Film composition | Depth of diffusion or penetration of Ag atom, angstrom | Light resistance |
|---|---|---|---|
| 80 | Ag—0.1% Bi—2% Ge—0.4% Nd | No diffusion or penetration | A |
| 81 | Ag—0.1% Bi—2% Ge—0.4% Y | No diffusion or penetration | A |
| 82 | Ag—0.1% Bi—2% Ge—0.5% Cu | No diffusion or penetration | A |
| 83 | Ag—0.1% Bi—2% Ge—0.5% Au | No diffusion or penetration | A |
| 84 | Ag—0.1% Bi—2% Ge—0.4% Nd—0.5% Cu | No diffusion or penetration | A |
| 85 | Ag—0.1% Bi—2% Ge—0.4% Nd—0.5% Au | No diffusion or penetration | A |
| 86 | Ag—0.1% Bi—2% Ge—0.4% Y—0.5% Cu | No diffusion or penetration | A |
| 87 | Ag—0.1% Bi—2% Ge—0.4% Y—0.5% Au | No diffusion or penetration | A |
| 88 | Ag—0.1% Bi—2% Al—0.4% Nd | No diffusion or penetration | A |
| 89 | Ag—0.1% Bi—2% Al—0.4% Y | No diffusion or penetration | A |
| 90 | Ag—0.1% Bi—2% Al—0.5% Cu | No diffusion or penetration | A |
| 91 | Ag—0.1% Bi—2% Al—0.5% Au | No diffusion or penetration | A |
| 92 | Ag—0.1% Bi—2% Al—0.4% Nd—0.5% Cu | No diffusion or penetration | A |
| 93 | Ag—0.1% Bi—2% Al—0.4% Nd—0.5% Au | No diffusion or penetration | A |
| 94 | Ag—0.1% Bi—2% Al—0.4% Y—0.5% Cu | No diffusion or penetration | A |
| 95 | Ag—0.1% Bi—2% Al—0.4% Y—0.5% Au | No diffusion or penetration | A |
| 96 | Ag—0.1% Bi—2% Zn—0.4% Nd | No diffusion or penetration | A |
| 97 | Ag—0.1% Bi—2% Zn—0.4% Y | No diffusion or penetration | A |
| 98 | Ag—0.1% Bi—2% Zn—0.5% Cu | No diffusion or penetration | A |
| 99 | Ag—0.1% Bi—2% Zn—0.5% Au | No diffusion or penetration | A |
| 100 | Ag—0.1% Bi—2% Zn—0.4% Nd—0.5% Cu | No diffusion or penetration | A |
| 101 | Ag—0.1% Bi—2% Zn—0.4% Nd—0.5% Au | No diffusion or penetration | A |
| 102 | Ag—0.1% Bi—2% Zn—0.4% Y—0.5% Cu | No diffusion or penetration | A |
| 103 | Ag—0.1% Bi—2% Zn—0.4% Y—0.5% Au | No diffusion or penetration | A |

TABLE 21

| Sample No. | Film composition | Change in average surface roughness, nm | Heat resistance |
|---|---|---|---|
| 1 | Ag | 5.5 | C |
| 2 | Ag—0.005% Bi | 2.5 | B |
| 3 | Ag—0.1% Bi | 2.0 | B |
| 4 | Ag—0.4% Bi | 1.7 | B |
| 5 | Ag—0.6% Bi | 1.6 | B |
| 6 | Ag—3% Sn | 1.7 | B |
| 7 | Ag—0.1% Bi—0.01% Sn | 0.5 | A |
| 8 | Ag—0.1% Bi—0.05% Sn | 0.5 | A |
| 9 | Ag—0.1% Bi—3% Sn | 0.4 | A |
| 10 | Ag—0.1% Bi—5% Sn | 0.4 | A |
| 11 | Ag—0.1% Bi—7% Sn | 0.4 | A |
| 12 | Ag—3% Si | 1.6 | B |
| 13 | Ag—0.1% Bi—0.01% Si | 0.5 | A |
| 14 | Ag—0.1% Bi—0.05% Si | 0.5 | A |

TABLE 21-continued

| Sample No. | Film composition | Change in average surface roughness, nm | Heat resistance |
|---|---|---|---|
| 15 | Ag—0.1% Bi—3% Si | 0.4 | A |
| 16 | Ag—0.1% Bi—5% Si | 0.4 | A |
| 17 | Ag—0.1% Bi—7% Si | 0.4 | A |

TABLE 22

| Sample No. | Film composition | Change in average surface roughness, nm | Heat resistance |
|---|---|---|---|
| 18 | Ag—3% In | 1.7 | B |
| 19 | Ag—0.1% Bi—0.01% In | 0.5 | A |
| 20 | Ag—0.1% Bi—0.05% In | 0.5 | A |
| 21 | Ag—0.1% Bi—3% In | 0.4 | A |
| 22 | Ag—0.1% Bi—5% In | 0.4 | A |
| 23 | Ag—0.1% Bi—7% In | 0.4 | A |
| 24 | Ag—3% Ga | 1.8 | B |
| 25 | Ag—0.1% Bi—0.01% Ga | 0.5 | A |
| 26 | Ag—0.1% Bi—0.05% Ga | 0.5 | A |
| 27 | Ag—0.1% Bi—3% Ga | 0.4 | A |
| 28 | Ag—0.1% Bi—5% Ga | 0.4 | A |
| 29 | Ag—0.1% Bi—7% Ga | 0.4 | A |
| 30 | Ag—3% Ge | 1.8 | B |
| 31 | Ag—0.1% Bi—0.01% Ge | 0.5 | A |
| 32 | Ag—0.1% Bi—0.05% Ge | 0.5 | A |
| 33 | Ag—0.1% Bi—3% Ge | 0.4 | A |
| 34 | Ag—0.1% Bi—5% Ge | 0.4 | A |
| 35 | Ag—0.1% Bi—7% Ge | 0.4 | A |

TABLE 23

| Sample No. | Film composition | Change in average surface roughness, nm | Heat resistance |
|---|---|---|---|
| 36 | Ag—3% Al | 1.9 | B |
| 37 | Ag—0.1% Bi—0.01% Al | 0.5 | A |
| 38 | Ag—0.1% Bi—0.05% Al | 0.5 | A |
| 39 | Ag—0.1% Bi—3% Al | 0.4 | A |
| 40 | Ag—0.1% Bi—5% Al | 0.4 | A |
| 41 | Ag—0.1% Bi—7% Al | 0.4 | A |
| 42 | Ag—3% Zn | 1.8 | B |
| 43 | Ag—0.1% Bi—0.01% Zn | 0.5 | A |
| 44 | Ag—0.1% Bi—0.05% Zn | 0.5 | A |
| 45 | Ag—0.1% Bi—3% Zn | 0.4 | A |
| 46 | Ag—0.1% Bi—5% Zn | 0.4 | A |
| 47 | Ag—0.1% Bi—7% Zn | 0.4 | A |
| 48 | Ag—0.1% Bi—2% Sn—0.4% Nd | 0.3 | A |
| 49 | Ag—0.1% Bi—2% Sn—0.4% Y | 0.3 | A |
| 50 | Ag—0.1% Bi—2% Sn—0.5% Cu | 0.4 | A |
| 51 | Ag—0.1% Bi—2% Sn—0.5% Au | 0.4 | A |
| 52 | Ag—0.1% Bi—2% Sn—0.4% Nd—0.5% Cu | 0.3 | A |
| 53 | Ag—0.1% Bi—2% Sn—0.4% Nd—0.5% Au | 0.3 | A |
| 54 | Ag—0.1% Bi—2% Sn—0.4% Y—0.5% Cu | 0.3 | A |
| 55 | Ag—0.1% Bi—2% Sn—0.4% Y—0.5% Au | 0.3 | A |

TABLE 24

| Sample No. | Film composition | Change in average surface roughness, nm | Heat resistance |
|---|---|---|---|
| 56 | Ag—0.1% Bi—2% Si—0.4% Nd | 0.3 | A |
| 57 | Ag—0.1% Bi—2% Si—0.4% Y | 0.3 | A |
| 58 | Ag—0.1% Bi—2% Si—0.5% Cu | 0.4 | A |
| 59 | Ag—0.1% Bi—2% Si—0.5% Au | 0.4 | A |
| 60 | Ag—0.1% Bi—2% Si—0.4% Nd—0.5% Cu | 0.3 | A |
| 61 | Ag—0.1% Bi—2% Si—0.4% Nd—0.5% Au | 0.3 | A |
| 62 | Ag—0.1% Bi—2% Si—0.4% Y—0.5% Cu | 0.3 | A |
| 63 | Ag—0.1% Bi—2% Si—0.4% Y—0.5% Au | 0.3 | A |
| 64 | Ag—0.1% Bi—2% In—0.4% Nd | 0.3 | A |
| 65 | Ag—0.1% Bi—2% In—0.4% Y | 0.3 | A |
| 66 | Ag—0.1% Bi—2% In—0.5% Cu | 0.4 | A |
| 67 | Ag—0.1% Bi—2% In—0.5% Au | 0.4 | A |
| 68 | Ag—0.1% Bi—2% In—0.4% Nd—0.5% Cu | 0.3 | A |
| 69 | Ag—0.1% Bi—2% In—0.4% Nd—0.5% Au | 0.3 | A |
| 70 | Ag—0.1% Bi—2% In—0.4% Y—0.5% Cu | 0.3 | A |
| 71 | Ag—0.1% Bi—2% In—0.4% Y—0.5% Au | 0.3 | A |
| 72 | Ag—0.1% Bi—2% Ga—0.4% Nd | 0.3 | A |
| 73 | Ag—0.1% Bi—2% Ga—0.4% Y | 0.3 | A |
| 74 | Ag—0.1% Bi—2% Ga—0.5% Cu | 0.4 | A |
| 75 | Ag—0.1% Bi—2% Ga—0.5% Au | 0.4 | A |
| 76 | Ag—0.1% Bi—2% Ga—0.4% Nd—0.5% Cu | 0.3 | A |
| 77 | Ag—0.1% Bi—2% Ga—0.4% Nd—0.5% Au | 0.3 | A |
| 78 | Ag—0.1% Bi—2% Ga—0.4% Y—0.5% Cu | 0.3 | A |
| 79 | Ag—0.1% Bi—2% Ga—0.4% Y—0.5% Au | 0.3 | A |

TABLE 25

| Sample No. | Film composition | Change in average surface roughness, nm | Heat resistance |
|---|---|---|---|
| 80 | Ag—0.1% Bi—2% Ge—0.4% Nd | 0.3 | A |
| 81 | Ag—0.1% Bi—2% Ge—0.4% Y | 0.3 | A |
| 82 | Ag—0.1% Bi—2% Ge—0.5% Cu | 0.4 | A |
| 83 | Ag—0.1% Bi—2% Ge—0.5% Au | 0.4 | A |
| 84 | Ag—0.1% Bi—2% Ge—0.4% Nd—0.5% Cu | 0.3 | A |
| 85 | Ag—0.1% Bi—2% Ge—0.4% Nd—0.5% Au | 0.3 | A |
| 86 | Ag—0.1% Bi—2% Ge—0.4% Y—0.5% Cu | 0.3 | A |
| 87 | Ag—0.1% Bi—2% Ge—0.4% Y—0.5% Au | 0.3 | A |
| 88 | Ag—0.1% Bi—2% Al—0.4% Nd | 0.3 | A |
| 89 | Ag—0.1% Bi—2% Al—0.4% Y | 0.3 | A |
| 90 | Ag—0.1% Bi—2% Al—0.5% Cu | 0.4 | A |
| 91 | Ag—0.1% Bi—2% Al—0.5% Au | 0.4 | A |
| 92 | Ag—0.1% Bi—2% Al—0.4% Nd—0.5% Cu | 0.3 | A |
| 93 | Ag—0.1% Bi—2% Al—0.4% Nd—0.5% Au | 0.3 | A |
| 94 | Ag—0.1% Bi—2% Al—0.4% Y—0.5% Cu | 0.3 | A |
| 95 | Ag—0.1% Bi—2% Al—0.4% Y—0.5% Au | 0.3 | A |
| 96 | Ag—0.1% Bi—2% Zn—0.4% Nd | 0.3 | A |
| 97 | Ag—0.1% Bi—2% Zn—0.4% Y | 0.3 | A |
| 98 | Ag—0.1% Bi—2% Zn—0.5% Cu | 0.4 | A |
| 99 | Ag—0.1% Bi—2% Zn—0.5% Au | 0.4 | A |
| 100 | Ag—0.1% Bi—2% Zn—0.4% Nd—0.5% Cu | 0.3 | A |
| 101 | Ag—0.1% Bi—2% Zn—0.4% Nd—0.5% Au | 0.3 | A |
| 102 | Ag—0.1% Bi—2% Zn—0.4% Y—0.5% Cu | 0.3 | A |
| 103 | Ag—0.1% Bi—2% Zn—0.4% Y—0.5% Au | 0.3 | A |

TABLE 26

| Sample No. | Film composition | Reflectivity, % | Evaluation of reflectivity |
|---|---|---|---|
| 1 | Ag | 18.0 | A |
| 2 | Ag—0.005% Bi | 17.8 | A |
| 3 | Ag—0.1% Bi | 17.6 | A |
| 4 | Ag—0.4% Bi | 16.2 | A |
| 5 | Ag—0.6% Bi | 14.4 | B |
| 6 | Ag—3% Sn | 16.0 | A |
| 7 | Ag—0.1% Bi—0.01% Sn | 17.4 | A |

TABLE 26-continued

| Sample No. | Film composition | Reflectivity, % | Evaluation of reflectivity |
|---|---|---|---|
| 8 | Ag—0.1% Bi—0.05% Sn | 16.5 | A |
| 9 | Ag—0.1% Bi—3% Sn | 15.6 | A |
| 10 | Ag—0.1% Bi—5% Sn | 15.2 | A |
| 11 | Ag—0.1% Bi—7% Sn | 14.3 | B |
| 12 | Ag—3% Si | 16.2 | A |
| 13 | Ag—0.1% Bi—0.01% Si | 17.5 | A |
| 14 | Ag—0.1% Bi—0.05% Si | 16.6 | A |
| 15 | Ag—0.1% Bi—3% Si | 15.7 | A |
| 16 | Ag—0.1% Bi—5% Si | 15.3 | A |
| 17 | Ag—0.1% Bi—7% Si | 14.4 | B |

TABLE 27

| Sample No. | Film composition | Reflectivity, % | Evaluation of reflectivity |
|---|---|---|---|
| 18 | Ag—3% In | 15.6 | A |
| 19 | Ag—0.1% Bi—0.01% In | 17.3 | A |
| 20 | Ag—0.1% Bi—0.05% In | 16.4 | A |
| 21 | Ag—0.1% Bi—3% In | 15.5 | A |
| 22 | Ag—0.1% Bi—5% In | 15.1 | A |
| 23 | Ag—0.1% Bi—7% In | 14.2 | B |
| 24 | Ag—3% Ga | 15.7 | A |
| 25 | Ag—0.1% Bi—0.01% Ga | 17.3 | A |
| 26 | Ag—0.1% Bi—0.05% Ga | 16.5 | A |
| 27 | Ag—0.1% Bi—3% Ga | 15.6 | A |
| 28 | Ag—0.1% Bi—5% Ga | 15.1 | A |
| 29 | Ag—0.1% Bi—7% Ga | 14.3 | B |
| 30 | Ag—3% Ge | 15.4 | A |
| 31 | Ag—0.1% Bi—0.01% Ge | 17.2 | A |
| 32 | Ag—0.1% Bi—0.05% Ge | 16.3 | A |
| 33 | Ag—0.1% Bi—3% Ge | 15.4 | A |
| 34 | Ag—0.1% Bi—5% Ge | 15.0 | A |
| 35 | Ag—0.1% Bi—7% Ge | 14.0 | B |

TABLE 28

| Sample No. | Film composition | Reflectivity, % | Evaluation of reflectivity |
|---|---|---|---|
| 36 | Ag—3% Al | 15.8 | A |
| 37 | Ag—0.1% Bi—0.01% Al | 17.3 | A |
| 38 | Ag—0.1% Bi—0.05% Al | 16.4 | A |
| 39 | Ag—0.1% Bi—3% Al | 15.5 | A |
| 40 | Ag—0.1% Bi—5% Al | 15.2 | A |
| 41 | Ag—0.1% Bi—7% Al | 14.4 | B |
| 42 | Ag—3% Zn | 15.6 | A |
| 43 | Ag—0.1% Bi—0.01% Zn | 17.1 | A |
| 44 | Ag—0.1% Bi—0.05% Zn | 16.2 | A |
| 45 | Ag—0.1% Bi—3% Zn | 15.5 | A |
| 46 | Ag—0.1% Bi—5% Zn | 15.1 | A |
| 47 | Ag—0.1% Bi—7% Zn | 14.0 | B |
| 48 | Ag—0.1% Bi—2% Sn—0.4% Nd | 15.4 | A |
| 49 | Ag—0.1% Bi—2% Sn—0.4% Y | 15.3 | A |
| 50 | Ag—0.1% Bi—2% Sn—0.5% Cu | 15.4 | A |
| 51 | Ag—0.1% Bi—2% Sn—0.5% Au | 15.5 | A |
| 52 | Ag—0.1% Bi—2% Sn—0.4% Nd—0.5% Cu | 15.3 | A |
| 53 | Ag—0.1% Bi—2% Sn—0.4% Nd—0.5% Au | 15.4 | A |
| 54 | Ag—0.1% Bi—2% Sn—0.4% Y—0.5% Cu | 15.2 | A |
| 55 | Ag—0.1% Bi—2% Sn—0.4% Y—0.5% Au | 15.3 | A |

TABLE 29

| Sample No. | Film composition | Reflectivity, % | Evaluation of reflectivity |
|---|---|---|---|
| 56 | Ag—0.1% Bi—2% Si—0.4% Nd | 15.5 | A |
| 57 | Ag—0.1% Bi—2% Si—0.4% Y | 15.4 | A |
| 58 | Ag—0.1% Bi—2% Si—0.5% Cu | 15.5 | A |
| 59 | Ag—0.1% Bi—2% Si—0.5% Au | 15.6 | A |
| 60 | Ag—0.1% Bi—2% Si—0.4% Nd—0.5% Cu | 15.4 | A |
| 61 | Ag—0.1% Bi—2% Si—0.4% Nd—0.5% Au | 15.5 | A |
| 62 | Ag—0.1% Bi—2% Si—0.4% Y—0.5% Cu | 15.3 | A |
| 63 | Ag—0.1% Bi—2% Si—0.4% Y—0.5% Au | 15.4 | A |
| 64 | Ag—0.1% Bi—2% In—0.4% Nd | 15.3 | A |
| 65 | Ag—0.1% Bi—2% In—0.4% Y | 15.2 | A |
| 66 | Ag—0.1% Bi—2% In—0.5% Cu | 15.3 | A |
| 67 | Ag—0.1% Bi—2% In—0.5% Au | 15.4 | A |
| 68 | Ag—0.1% Bi—2% In—0.4% Nd—0.5% Cu | 15.2 | A |
| 69 | Ag—0.1% Bi—2% In—0.4% Nd—0.5% Au | 15.3 | A |
| 70 | Ag—0.1% Bi—2% In—0.4% Y—0.5% Cu | 15.1 | A |
| 71 | Ag—0.1% Bi—2% In—0.4% Y—0.5% Au | 15.2 | A |
| 72 | Ag—0.1% Bi—2% Ga—0.4% Nd | 15.4 | A |
| 73 | Ag—0.1% Bi—2% Ga—0.4% Y | 15.3 | A |
| 74 | Ag—0.1% Bi—2% Ga—0.5% Cu | 15.4 | A |
| 75 | Ag—0.1% Bi—2% Ga—0.5% Au | 15.5 | A |
| 76 | Ag—0.1% Bi—2% Ga—0.4% Nd—0.5% Cu | 15.3 | A |
| 77 | Ag—0.1% Bi—2% Ga—0.4% Nd—0.5% Au | 15.4 | A |
| 78 | Ag—0.1% Bi—2% Ga—0.4% Y—0.5% Cu | 15.2 | A |
| 79 | Ag—0.1% Bi—2% Ga—0.4% Y—0.5% Au | 15.3 | A |

TABLE 30

| Sample No. | Film composition | Reflectivity, % | Evaluation of reflectivity |
|---|---|---|---|
| 80 | Ag—0.1% Bi—2% Ge—0.4% Nd | 15.2 | A |
| 81 | Ag—0.1% Bi—2% Ge—0.4% Y | 15.1 | A |
| 82 | Ag—0.1% Bi—2% Ge—0.5% Cu | 15.2 | A |
| 83 | Ag—0.1% Bi—2% Ge—0.5% Au | 15.3 | A |
| 84 | Ag—0.1% Bi—2% Ge—0.4% Nd—0.5% Cu | 15.1 | A |
| 85 | Ag—0.1% Bi—2% Ge—0.4% Nd—0.5% Au | 15.2 | A |
| 86 | Ag—0.1% Bi—2% Ge—0.4% Y—0.5% Cu | 15.0 | A |
| 87 | Ag—0.1% Bi—2% Ge—0.4% Y—0.5% Au | 15.1 | A |
| 88 | Ag—0.1% Bi—2% Al—0.4% Nd | 15.3 | A |
| 89 | Ag—0.1% Bi—2% Al—0.4% Y | 15.2 | A |
| 90 | Ag—0.1% Bi—2% Al—0.5% Cu | 15.3 | A |
| 91 | Ag—0.1% Bi—2% Al—0.5% Au | 15.4 | A |
| 92 | Ag—0.1% Bi—2% Al—0.4% Nd—0.5% Cu | 15.2 | A |
| 93 | Ag—0.1% Bi—2% Al—0.4% Nd—0.5% Au | 15.3 | A |
| 94 | Ag—0.1% Bi—2% Al—0.4% Y—0.5% Cu | 15.1 | A |
| 95 | Ag—0.1% Bi—2% Al—0.4% Y—0.5% Au | 15.2 | A |
| 96 | Ag—0.1% Bi—2% Zn—0.4% Nd | 15.3 | A |
| 97 | Ag—0.1% Bi—2% Zn—0.4% Y | 15.2 | A |
| 98 | Ag—0.1% Bi—2% Zn—0.5% Cu | 15.3 | A |
| 99 | Ag—0.1% Bi—2% Zn—0.5% Au | 15.4 | A |
| 100 | Ag—0.1% Bi—2% Zn—0.4% Nd—0.5% Cu | 15.2 | A |
| 101 | Ag—0.1% Bi—2% Zn—0.4% Nd—0.5% Au | 15.3 | A |
| 102 | Ag—0.1% Bi—2% Zn—0.4% Y—0.5% Cu | 15.1 | A |
| 103 | Ag—0.1% Bi—2% Zn—0.4% Y—0.5% Au | 15.2 | A |

TABLE 31

| Sample No. | Film composition | Transmissivity, % | Evaluation of transmissivity |
|---|---|---|---|
| 1 | Ag | 68.0 | A |
| 2 | Ag—0.005% Bi | 67.7 | A |
| 3 | Ag—0.1% Bi | 66.2 | A |
| 4 | Ag—0.4% Bi | 62.5 | A |
| 5 | Ag—0.6% Bi | 59.0 | B |
| 6 | Ag—3% Sn | 65.5 | A |
| 7 | Ag—0.1% Bi—0.01% Sn | 66.0 | A |

TABLE 31-continued

| Sample No. | Film composition | Transmissivity, % | Evaluation of transmissivity |
|---|---|---|---|
| 8 | Ag—0.1% Bi—0.05% Sn | 65.1 | A |
| 9 | Ag—0.1% Bi—3% Sn | 63.3 | A |
| 10 | Ag—0.1% Bi—5% Sn | 61.0 | A |
| 11 | Ag—0.1% Bi—7% Sn | 58.5 | B |
| 12 | Ag—3% Si | 65.8 | A |
| 13 | Ag—0.1% Bi—0.01% Si | 66.1 | A |
| 14 | Ag—0.1% Bi—0.05% Si | 65.0 | A |
| 15 | Ag—0.1% Bi—3% Si | 63.0 | A |
| 16 | Ag—0.1% Bi—5% Si | 61.0 | A |
| 17 | Ag—0.1% Bi—7% Si | 58.9 | B |

TABLE 32

| Sample No. | Film composition | Transmissivity, % | Evaluation of transmissivity |
|---|---|---|---|
| 18 | Ag—3% In | 65.4 | A |
| 19 | Ag—0.1% Bi—0.01% In | 66.2 | A |
| 20 | Ag—0.1% Bi—0.05% In | 65.1 | A |
| 21 | Ag—0.1% Bi—3% In | 63.3 | A |
| 22 | Ag—0.1% Bi—5% In | 60.9 | A |
| 23 | Ag—0.1% Bi—7% In | 58.6 | B |
| 24 | Ag—3% Ga | 65.2 | A |
| 25 | Ag—0.1% Bi—0.01% Ga | 66.0 | A |
| 26 | Ag—0.1% Bi—0.05% Ga | 64.9 | A |
| 27 | Ag—0.1% Bi—3% Ga | 62.9 | A |
| 28 | Ag—0.1% Bi—5% Ga | 60.4 | A |
| 29 | Ag—0.1% Bi—7% Ga | 57.8 | B |
| 30 | Ag—3% Ge | 64.7 | A |
| 31 | Ag—0.1% Bi—0.01% Ge | 65.8 | A |
| 32 | Ag—0.1% Bi—0.05% Ge | 64.8 | A |
| 33 | Ag—0.1% Bi—3% Ge | 62.8 | A |
| 34 | Ag—0.1% Bi—5% Ge | 60.2 | A |
| 35 | Ag—0.1% Bi—7% Ge | 57.6 | B |

TABLE 33

| Sample No. | Film composition | Transmissivity, % | Evaluation of transmissivity |
|---|---|---|---|
| 36 | Ag—3% Al | 63.5 | A |
| 37 | Ag—0.1% Bi—0.01% Al | 65.9 | A |
| 38 | Ag—0.1% Bi—0.05% Al | 65.0 | A |
| 39 | Ag—0.1% Bi—3% Al | 63.0 | A |
| 40 | Ag—0.1% Bi—5% Al | 60.5 | A |
| 41 | Ag—0.1% Bi—7% Al | 57.9 | B |
| 42 | Ag—3% Zn | 64.0 | A |
| 43 | Ag—0.1% Bi—0.01% Zn | 66.0 | A |
| 44 | Ag—0.1% Bi—0.05% Zn | 65.1 | A |
| 45 | Ag—0.1% Bi—3% Zn | 63.1 | A |
| 46 | Ag—0.1% Bi—5% Zn | 60.7 | A |
| 47 | Ag—0.1% Bi—7% Zn | 58.2 | B |
| 48 | Ag—0.1% Bi—2% Sn—0.4% Nd | 65.7 | A |
| 49 | Ag—0.1% Bi—2% Sn—0.4% Y | 65.6 | A |
| 50 | Ag—0.1% Bi—2% Sn—0.5% Cu | 65.7 | A |
| 51 | Ag—0.1% Bi—2% Sn—0.5% Au | 65.8 | A |
| 52 | Ag—0.1% Bi—2% Sn—0.4% Nd—0.5% Cu | 65.6 | A |
| 53 | Ag—0.1% Bi—2% Sn—0.4% Nd—0.5% Au | 65.7 | A |
| 54 | Ag—0.1% Bi—2% Sn—0.4% Y—0.5% Cu | 65.5 | A |
| 55 | Ag—0.1% Bi—2% Sn—0.4% Y—0.5% Au | 65.6 | A |

TABLE 34

| Sample No. | Film composition | Transmissivity, % | Evaluation of transmissivity |
|---|---|---|---|
| 56 | Ag—0.1% Bi—2% Si—0.4% Nd | 65.8 | A |
| 57 | Ag—0.1% Bi—2% Si—0.4% Y | 65.7 | A |
| 58 | Ag—0.1% Bi—2% Si—0.5% Cu | 65.8 | A |
| 59 | Ag—0.1% Bi—2% Si—0.5% Au | 65.9 | A |
| 60 | Ag—0.1% Bi—2% Si—0.4% Nd—0.5% Cu | 65.7 | A |
| 61 | Ag—0.1% Bi—2% Si—0.4% Nd—0.5% Au | 65.8 | A |
| 62 | Ag—0.1% Bi—2% Si—0.4% Y—0.5% Cu | 65.6 | A |
| 63 | Ag—0.1% Bi—2% Si—0.4% Y—0.5% Au | 65.7 | A |
| 64 | Ag—0.1% Bi—2% In—0.4% Nd | 65.9 | A |
| 65 | Ag—0.1% Bi—2% In—0.4% Y | 65.8 | A |
| 66 | Ag—0.1% Bi—2% In—0.5% Cu | 65.9 | A |
| 67 | Ag—0.1% Bi—2% In—0.5% Au | 66.0 | A |
| 68 | Ag—0.1% Bi—2% In—0.4% Nd—0.5% Cu | 65.8 | A |
| 69 | Ag—0.1% Bi—2% In—0.4% Nd—0.5% Au | 65.9 | A |
| 70 | Ag—0.1% Bi—2% In—0.4% Y—0.5% Cu | 65.7 | A |
| 71 | Ag—0.1% Bi—2% In—0.4% Y—0.5% Au | 65.8 | A |
| 72 | Ag—0.1% Bi—2% Ga—0.4% Nd | 65.7 | A |
| 73 | Ag—0.1% Bi—2% Ga—0.4% Y | 65.6 | A |
| 74 | Ag—0.1% Bi—2% Ga—0.5% Cu | 65.7 | A |
| 75 | Ag—0.1% Bi—2% Ga—0.5% Au | 65.8 | A |
| 76 | Ag—0.1% Bi—2% Ga—0.4% Nd—0.5% Cu | 65.6 | A |
| 77 | Ag—0.1% Bi—2% Ga—0.4% Nd—0.5% Au | 65.7 | A |
| 78 | Ag—0.1% Bi—2% Ga—0.4% Y—0.5% Cu | 65.5 | A |
| 79 | Ag—0.1% Bi—2% Ga—0.4% Y—0.5% Au | 65.6 | A |

TABLE 35

| Sample No. | Film composition | Transmissivity, % | Evaluation of transmissivity |
|---|---|---|---|
| 80 | Ag—0.1% Bi—2% Ge—0.4% Nd | 65.5 | A |
| 81 | Ag—0.1% Bi—2% Ge—0.4% Y | 65.4 | A |
| 82 | Ag—0.1% Bi—2% Ge—0.5% Cu | 65.5 | A |
| 83 | Ag—0.1% Bi—2% Ge—0.5% Au | 65.6 | A |
| 84 | Ag—0.1% Bi—2% Ge—0.4% Nd—0.5% Cu | 65.4 | A |
| 85 | Ag—0.1% Bi—2% Ge—0.4% Nd—0.5% Au | 65.5 | A |
| 86 | Ag—0.1% Bi—2% Ge—0.4% Y—0.5% Cu | 65.3 | A |
| 87 | Ag—0.1% Bi—2% Ge—0.4% Y—0.5% Au | 65.4 | A |
| 88 | Ag—0.1% Bi—2% Al—0.4% Nd | 65.6 | A |
| 89 | Ag—0.1% Bi—2% Al—0.4% Y | 65.5 | A |
| 90 | Ag—0.1% Bi—2% Al—0.5% Cu | 65.6 | A |
| 91 | Ag—0.1% Bi—2% Al—0.5% Au | 65.7 | A |
| 92 | Ag—0.1% Bi—2% Al—0.4% Nd—0.5% Cu | 65.5 | A |
| 93 | Ag—0.1% Bi—2% Al—0.4% Nd—0.5% Au | 65.6 | A |
| 94 | Ag—0.1% Bi—2% Al—0.4% Y—0.5% Cu | 65.4 | A |
| 95 | Ag—0.1% Bi—2% Al—0.4% Y—0.5% Au | 65.5 | A |
| 96 | Ag—0.1% Bi—2% Zn—0.4% Nd | 65.7 | A |
| 97 | Ag—0.1% Bi—2% Zn—0.4% Y | 65.6 | A |
| 98 | Ag—0.1% Bi—2% Zn—0.5% Cu | 65.7 | A |
| 99 | Ag—0.1% Bi—2% Zn—0.5% Au | 65.8 | A |
| 100 | Ag—0.1% Bi—2% Zn—0.4% Nd—0.5% Cu | 65.6 | A |
| 101 | Ag—0.1% Bi—2% Zn—0.4% Nd—0.5% Au | 65.7 | A |
| 102 | Ag—0.1% Bi—2% Zn—0.4% Y—0.5% Cu | 65.5 | A |
| 103 | Ag—0.1% Bi—2% Zn—0.4% Y—0.5% Au | 65.6 | A |

TABLE 36

| Sample No. | Film composition | Absorptivity, % | Evaluation of absorptivity |
|---|---|---|---|
| 1 | Ag | 14.0 | A |
| 2 | Ag—0.005% Bi | 14.5 | A |
| 3 | Ag—0.1% Bi | 16.2 | A |

TABLE 36-continued

| Sample No. | Film composition | Absorptivity, % | Evaluation of absorptivity |
|---|---|---|---|
| 4 | Ag—0.4% Bi | 21.3 | A |
| 5 | Ag—0.6% Bi | 26.6 | B |
| 6 | Ag—3% Sn | 18.5 | A |
| 7 | Ag—0.1% Bi—0.01% Sn | 16.6 | A |
| 8 | Ag—0.1% Bi—0.05% Sn | 18.4 | A |
| 9 | Ag—0.1% Bi—3% Sn | 21.1 | A |
| 10 | Ag—0.1% Bi—5% Sn | 23.8 | A |
| 11 | Ag—0.1% Bi—7% Sn | 27.2 | B |
| 12 | Ag—3% Si | 18.0 | A |
| 13 | Ag—0.1% Bi—0.01% Si | 16.4 | A |
| 14 | Ag—0.1% Bi—0.05% Si | 18.4 | A |
| 15 | Ag—0.1% Bi—3% Si | 21.3 | A |
| 16 | Ag—0.1% Bi—5% Si | 23.7 | A |
| 17 | Ag—0.1% Bi—7% Si | 26.7 | B |

TABLE 37

| Sample No. | Film composition | Absorptivity, % | Evaluation of absorptivity |
|---|---|---|---|
| 18 | Ag—3% In | 19.0 | A |
| 19 | Ag—0.1% Bi—0.01% In | 16.5 | A |
| 20 | Ag—0.1% Bi—0.05% In | 18.5 | A |
| 21 | Ag—0.1% Bi—3% In | 21.2 | A |
| 22 | Ag—0.1% Bi—5% In | 24.0 | A |
| 23 | Ag—0.1% Bi—7% In | 27.2 | B |
| 24 | Ag—3% Ga | 19.1 | A |
| 25 | Ag—0.1% Bi—0.01% Ga | 16.7 | A |
| 26 | Ag—0.1% Bi—0.05% Ga | 18.6 | A |
| 27 | Ag—0.1% Bi—3% Ga | 21.5 | A |
| 28 | Ag—0.1% Bi—5% Ga | 24.5 | A |
| 29 | Ag—0.1% Bi—7% Ga | 27.9 | B |
| 30 | Ag—3% Ge | 19.9 | A |
| 31 | Ag—0.1% Bi—0.01% Ge | 17.0 | A |
| 32 | Ag—0.1% Bi—0.05% Ge | 18.9 | A |
| 33 | Ag—0.1% Bi—3% Ge | 21.8 | A |
| 34 | Ag—0.1% Bi—5% Ge | 24.8 | A |
| 35 | Ag—0.1% Bi—7% Ge | 28.4 | B |

TABLE 38

| Sample No. | Film composition | Absorptivity, % | Evaluation of absorptivity |
|---|---|---|---|
| 36 | Ag—3% Al | 20.7 | A |
| 37 | Ag—0.1% Bi—0.01% Al | 16.8 | A |
| 38 | Ag—0.1% Bi—0.05% Al | 18.6 | A |
| 39 | Ag—0.1% Bi—3% Al | 21.5 | A |
| 40 | Ag—0.1% Bi—5% Al | 24.3 | A |
| 41 | Ag—0.1% Bi—7% Al | 27.7 | B |
| 42 | Ag—3% Zn | 20.4 | A |
| 43 | Ag—0.1% Bi—0.01% Zn | 16.9 | A |
| 44 | Ag—0.1% Bi—0.05% Zn | 18.7 | A |
| 45 | Ag—0.1% Bi—3% Zn | 21.4 | A |
| 46 | Ag—0.1% Bi—5% Zn | 24.2 | A |
| 47 | Ag—0.1% Bi—7% Zn | 27.8 | B |
| 48 | Ag—0.1% Bi—2% Sn—0.4% Nd | 18.9 | A |
| 49 | Ag—0.1% Bi—2% Sn—0.4% Y | 19.1 | A |
| 50 | Ag—0.1% Bi—2% Sn—0.5% Cu | 18.9 | A |
| 51 | Ag—0.1% Bi—2% Sn—0.5% Au | 18.7 | A |
| 52 | Ag—0.1% Bi—2% Sn—0.4% Nd—0.5% Cu | 19.1 | A |
| 53 | Ag—0.1% Bi—2% Sn—0.4% Nd—0.5% Au | 18.9 | A |
| 54 | Ag—0.1% Bi—2% Sn—0.4% Y—0.5% Cu | 19.3 | A |
| 55 | Ag—0.1% Bi—2% Sn—0.4% Y—0.5% Au | 19.1 | A |

TABLE 39

| Sample No. | Film composition | Absorptivity, % | Evaluation of absorptivity |
|---|---|---|---|
| 56 | Ag—0.1% Bi—2% Si—0.4% Nd | 18.7 | A |
| 57 | Ag—0.1% Bi—2% Si—0.4% Y | 18.9 | A |
| 58 | Ag—0.1% Bi—2% Si—0.5% Cu | 18.7 | A |
| 59 | Ag—0.1% Bi—2% Si—0.5% Au | 18.5 | A |
| 60 | Ag—0.1% Bi—2% Si—0.4% Nd—0.5% Cu | 18.9 | A |
| 61 | Ag—0.1% Bi—2% Si—0.4% Nd—0.5% Au | 18.7 | A |
| 62 | Ag—0.1% Bi—2% Si—0.4% Y—0.5% Cu | 19.1 | A |
| 63 | Ag—0.1% Bi—2% Si—0.4% Y—0.5% Au | 18.9 | A |
| 64 | Ag—0.1% Bi—2% In—0.4% Nd | 18.8 | A |
| 65 | Ag—0.1% Bi—2% In—0.4% Y | 19.0 | A |
| 66 | Ag—0.1% Bi—2% In—0.5% Cu | 18.8 | A |
| 67 | Ag—0.1% Bi—2% In—0.5% Au | 18.6 | A |
| 68 | Ag—0.1% Bi—2% In—0.4% Nd—0.5% Cu | 19.0 | A |
| 69 | Ag—0.1% Bi—2% In—0.4% Nd—0.5% Au | 18.8 | A |
| 70 | Ag—0.1% Bi—2% In—0.4% Y—0.5% Cu | 19.2 | A |
| 71 | Ag—0.1% Bi—2% In—0.4% Y—0.5% Au | 19.0 | A |
| 72 | Ag—0.1% Bi—2% Ga—0.4% Nd | 18.9 | A |
| 73 | Ag—0.1% Bi—2% Ga—0.4% Y | 19.1 | A |
| 74 | Ag—0.1% Bi—2% Ga—0.5% Cu | 18.9 | A |
| 75 | Ag—0.1% Bi—2% Ga—0.5% Au | 18.7 | A |
| 76 | Ag—0.1% Bi—2% Ga—0.4% Nd—0.5% Cu | 19.1 | A |
| 77 | Ag—0.1% Bi—2% Ga—0.4% Nd—0.5% Au | 18.9 | A |
| 78 | Ag—0.1% Bi—2% Ga—0.4% Y—0.5% Cu | 19.3 | A |
| 79 | Ag—0.1% Bi—2% Ga—0.4% Y—0.5% Au | 19.1 | A |

TABLE 40

| Sample No. | Film composition | Absorptivity, % | Evaluation of absorptivity |
|---|---|---|---|
| 80 | Ag—0.1% Bi—2% Ge—0.4% Nd | 19.3 | A |
| 81 | Ag—0.1% Bi—2% Ge—0.4% Y | 19.5 | A |
| 82 | Ag—0.1% Bi—2% Ge—0.5% Cu | 19.3 | A |
| 83 | Ag—0.1% Bi—2% Ge—0.5% Au | 19.1 | A |
| 84 | Ag—0.1% Bi—2% Ge—0.4% Nd—0.5% Cu | 19.5 | A |
| 85 | Ag—0.1% Bi—2% Ge—0.4% Nd—0.5% Au | 19.3 | A |
| 86 | Ag—0.1% Bi—2% Ge—0.4% Y—0.5% Cu | 19.7 | A |
| 87 | Ag—0.1% Bi—2% Ge—0.4% Y—0.5% Au | 19.5 | A |
| 88 | Ag—0.1% Bi—2% Al—0.4% Nd | 19.1 | A |
| 89 | Ag—0.1% Bi—2% Al—0.4% Y | 19.3 | A |
| 90 | Ag—0.1% Bi—2% Al—0.5% Cu | 19.1 | A |
| 91 | Ag—0.1% Bi—2% Al—0.5% Au | 18.9 | A |
| 92 | Ag—0.1% Bi—2% Al—0.4% Nd—0.5% Cu | 19.3 | A |
| 93 | Ag—0.1% Bi—2% Al—0.4% Nd—0.5% Au | 19.1 | A |
| 94 | Ag—0.1% Bi—2% Al—0.4% Y—0.5% Cu | 19.5 | A |
| 95 | Ag—0.1% Bi—2% Al—0.4% Y—0.5% Au | 19.3 | A |
| 96 | Ag—0.1% Bi—2% Zn—0.4% Nd | 19.0 | A |
| 97 | Ag—0.1% Bi—2% Zn—0.4% Y | 19.2 | A |
| 98 | Ag—0.1% Bi—2% Zn—0.5% Cu | 19.0 | A |
| 99 | Ag—0.1% Bi—2% Zn—0.5% Au | 18.8 | A |
| 100 | Ag—0.1% Bi—2% Zn—0.4% Nd—0.5% Cu | 19.2 | A |
| 101 | Ag—0.1% Bi—2% Zn—0.4% Nd—0.5% Au | 19.0 | A |
| 102 | Ag—0.1% Bi—2% Zn—0.4% Y—0.5% Cu | 19.4 | A |
| 103 | Ag—0.1% Bi—2% Zn—0.4% Y—0.5% Au | 19.2 | A |

TABLE 41

| Sample No. | Film composition | Thermal conductivity, W/(m·K) | Evaluation of thermal conductivity |
|---|---|---|---|
| 1 | Ag | 320 | A |
| 2 | Ag—0.005% Bi | 307 | A |

TABLE 41-continued

| Sample No. | Film composition | Thermal conductivity, W/(m · K) | Evaluation of thermal conductivity |
|---|---|---|---|
| 3 | Ag—0.1% Bi | 222 | A |
| 4 | Ag—0.4% Bi | 189 | A |
| 5 | Ag—0.6% Bi | 155 | B |
| 6 | Ag—3% Sn | 209 | A |
| 7 | Ag—0.1% Bi—0.01% Sn | 215 | A |
| 8 | Ag—0.1% Bi—0.05% Sn | 210 | A |
| 9 | Ag—0.1% Bi—3% Sn | 188 | A |
| 10 | Ag—0.1% Bi—5% Sn | 165 | A |
| 11 | Ag—0.1% Bi—7% Sn | 143 | B |
| 12 | Ag—3% Si | 214 | A |
| 13 | Ag—0.1% Bi—0.01% Si | 220 | A |
| 14 | Ag—0.1% Bi—0.05% Si | 216 | A |
| 15 | Ag—0.1% Bi—3% Si | 192 | A |
| 16 | Ag—0.1% Bi—5% Si | 167 | A |
| 17 | Ag—0.1% Bi—7% Si | 142 | B |

TABLE 42

| Sample No. | Film composition | Thermal conductivity, W/(m · K) | Evaluation of thermal conductivity |
|---|---|---|---|
| 18 | Ag—3% In | 211 | A |
| 19 | Ag—0.1% Bi—0.01% In | 214 | A |
| 20 | Ag—0.1% Bi—0.05% In | 210 | A |
| 21 | Ag—0.1% Bi—3% In | 187 | A |
| 22 | Ag—0.1% Bi—5% In | 164 | A |
| 23 | Ag—0.1% Bi—7% In | 141 | B |
| 24 | Ag—3% Ga | 205 | A |
| 25 | Ag—0.1% Bi—0.01% Ga | 210 | A |
| 26 | Ag—0.1% Bi—0.05% Ga | 206 | A |
| 27 | Ag—0.1% Bi—3% Ga | 185 | A |
| 28 | Ag—0.1% Bi—5% Ga | 164 | A |
| 29 | Ag—0.1% Bi—7% Ga | 143 | B |
| 30 | Ag—3% Ge | 191 | A |
| 31 | Ag—0.1% Bi—0.01% Ge | 198 | A |
| 32 | Ag—0.1% Bi—0.05% Ge | 193 | A |
| 33 | Ag—0.1% Bi—3% Ge | 177 | A |
| 34 | Ag—0.1% Bi—5% Ge | 161 | A |
| 35 | Ag—0.1% Bi—7% Ge | 145 | B |

TABLE 43

| Sample No. | Film composition | Thermal conductivity, W/(m · K) | Evaluation of thermal conductivity |
|---|---|---|---|
| 36 | Ag—3% Al | 200 | A |
| 37 | Ag—0.1% Bi—0.01% Al | 206 | A |
| 38 | Ag—0.1% Bi—0.05% Al | 202 | A |
| 39 | Ag—0.1% Bi—3% Al | 184 | A |
| 40 | Ag—0.1% Bi—5% Al | 165 | A |
| 41 | Ag—0.1% Bi—7% Al | 146 | B |
| 42 | Ag—3% Zn | 203 | A |
| 43 | Ag—0.1% Bi—0.01% Zn | 208 | A |
| 44 | Ag—0.1% Bi—0.05% Zn | 205 | A |
| 45 | Ag—0.1% Bi—3% Zn | 184 | A |
| 46 | Ag—0.1% Bi—5% Zn | 163 | A |
| 47 | Ag—0.1% Bi—7% Zn | 142 | B |
| 48 | Ag—0.1% Bi—2% Sn—0.4% Nd | 183 | A |
| 49 | Ag—0.1% Bi—2% Sn—0.4% Y | 179 | A |
| 50 | Ag—0.1% Bi—2% Sn—0.5% Cu | 190 | A |
| 51 | Ag—0.1% Bi—2% Sn—0.5% Au | 193 | A |
| 52 | Ag—0.1% Bi—2% Sn—0.4% Nd—0.5% Cu | 174 | A |
| 53 | Ag—0.1% Bi—2% Sn—0.4% Nd—0.5% Au | 178 | A |
| 54 | Ag—0.1% Bi—2% Sn—0.4% Y—0.5% Cu | 170 | A |
| 55 | Ag—0.1% Bi—2% Sn—0.4% Y—0.5% Au | 174 | A |

TABLE 44

| Sample No. | Film composition | Thermal conductivity, W/(m · K) | Evaluation of thermal conductivity |
|---|---|---|---|
| 56 | Ag—0.1% Bi—2% Si—0.4% Nd | 187 | A |
| 57 | Ag—0.1% Bi—2% Si—0.4% Y | 183 | A |
| 58 | Ag—0.1% Bi—2% Si—0.5% Cu | 194 | A |
| 59 | Ag—0.1% Bi—2% Si—0.5% Au | 198 | A |
| 60 | Ag—0.1% Bi—2% Si—0.4% Nd—0.5% Cu | 179 | A |
| 61 | Ag—0.1% Bi—2% Si—0.4% Nd—0.5% Au | 183 | A |
| 62 | Ag—0.1% Bi—2% Si—0.4% Y—0.5% Cu | 175 | A |
| 63 | Ag—0.1% Bi—2% Si—0.4% Y—0.5% Au | 179 | A |
| 64 | Ag—0.1% Bi—2% In—0.4% Nd | 182 | A |
| 65 | Ag—0.1% Bi—2% In—0.4% Y | 178 | A |
| 66 | Ag—0.1% Bi—2% In—0.5% Cu | 189 | A |
| 67 | Ag—0.1% Bi—2% In—0.5% Au | 192 | A |
| 68 | Ag—0.1% Bi—2% In—0.4% Nd—0.5% Cu | 173 | A |
| 69 | Ag—0.1% Bi—2% In—0.4% Nd—0.5% Au | 177 | A |
| 70 | Ag—0.1% Bi—2% In—0.4% Y—0.5% Cu | 169 | A |
| 71 | Ag—0.1% Bi—2% In—0.4% Y—0.5% Au | 173 | A |
| 72 | Ag—0.1% Bi—2% Ga—0.4% Nd | 180 | A |

TABLE 44-continued

| Sample No. | Film composition | Thermal conductivity, W/(m · K) | Evaluation of thermal conductivity |
|---|---|---|---|
| 73 | Ag—0.1% Bi—2% Ga—0.4% Y | 176 | A |
| 74 | Ag—0.1% Bi—2% Ga—0.5% Cu | 187 | A |
| 75 | Ag—0.1% Bi—2% Ga—0.5% Au | 190 | A |
| 76 | Ag—0.1% Bi—2% Ga—0.4% Nd—0.5% Cu | 171 | A |
| 77 | Ag—0.1% Bi—2% Ga—0.4% Nd—0.5% Au | 175 | A |
| 78 | Ag—0.1% Bi—2% Ga—0.4% Y—0.5% Cu | 167 | A |
| 79 | Ag—0.1% Bi—2% Ga—0.4% Y—0.5% Au | 171 | A |

TABLE 45

| Sample No. | Film composition | Thermal conductivity, W/(m · K) | Evaluation of thermal conductivity |
|---|---|---|---|
| 80 | Ag—0.1% Bi—2% Ge—0.4% Nd | 172 | A |
| 81 | Ag—0.1% Bi—2% Ge—0.4% Y | 168 | A |
| 82 | Ag—0.1% Bi—2% Ge—0.5% Cu | 179 | A |
| 83 | Ag—0.1% Bi—2% Ge—0.5% Au | 183 | A |
| 84 | Ag—0.1% Bi—2% Ge—0.4% Nd—0.5% Cu | 164 | A |
| 85 | Ag—0.1% Bi—2% Ge—0.4% Nd—0.5% Au | 168 | A |
| 86 | Ag—0.1% Bi—2% Ge—0.4% Y—0.5% Cu | 160 | A |
| 87 | Ag—0.1% Bi—2% Ge—0.4% Y—0.5% Au | 164 | A |
| 88 | Ag—0.1% Bi—2% Al—0.4% Nd | 179 | A |
| 89 | Ag—0.1% Bi—2% Al—0.4% Y | 175 | A |
| 90 | Ag—0.1% Bi—2% Al—0.5% Cu | 186 | A |
| 91 | Ag—0.1% Bi—2% Al—0.5% Au | 190 | A |
| 92 | Ag—0.1% Bi—2% Al—0.4% Nd—0.5% Cu | 171 | A |
| 93 | Ag—0.1% Bi—2% Al—0.4% Nd—0.5% Au | 175 | A |
| 94 | Ag—0.1% Bi—2% Al—0.4% Y—0.5% Cu | 167 | A |
| 95 | Ag—0.1% Bi—2% Al—0.4% Y—0.5% Au | 171 | A |
| 96 | Ag—0.1% Bi—2% Zn—0.4% Nd | 179 | A |
| 97 | Ag—0.1% Bi—2% Zn—0.4% Y | 175 | A |
| 98 | Ag—0.1% Bi—2% Zn—0.5% Cu | 186 | A |
| 99 | Ag—0.1% Bi—2% Zn—0.5% Au | 190 | A |
| 100 | Ag—0.1% Bi—2% Zn—0.4% Nd—0.5% Cu | 171 | A |
| 101 | Ag—0.1% Bi—2% Zn—0.4% Nd—0.5% Au | 175 | A |
| 102 | Ag—0.1% Bi—2% Zn—0.4% Y—0.5% Cu | 167 | A |
| 103 | Ag—0.1% Bi—2% Zn—0.4% Y—0.5% Au | 171 | A |

What is claimed is:

1. A semi-reflective film or reflective film for an optical information recording medium comprising a Ag based alloy, wherein the Ag based alloy consists essentially 0.005 to 0.4% (at % unless otherwise noted) of Bi and 0.05 to 5% of Ge, optionally at least one rare earth metal element, and optionally at least one element selected from the group consisting of Cu, Au, Rh, Pd, and Pt at a total content of 0.1 to 3%, optionally 0.05 to 5% in total of Zn, optionally 0.05 to 5% in total of Al, optionally 0.05 to 5% in total of Ga, optionally 0.05 to 5% in total of In, optionally 0.05 to 5% in total of Si and optionally 0.05 to 500 in total of Ge and Sn.

2. The semi-reflective film or reflective film for an optical information recording medium comprising a Ag based alloy according to claim 1 wherein the semi-reflective film has a film structure wherein the Bi is rich in the top and/or bottom interface.

3. The semi-reflective film or reflective film for an optical information recording medium comprising a Ag based alloy according to claim 1 wherein the semi-reflective film has a structure wherein the Ge is rich in the top and/or bottom interface.

4. The semi-reflective film or reflective film for an optical information recording medium comprising a Ag based alloy according to claim 1 wherein the Ag based alloy according to claim 1 wherein the Ag based alloy contains at least one rare earth metal element.

5. The semi-reflective film or reflective film for an optical information recording medium comprising a Ag based alloy according to claim 4 wherein the rare earth metal element is Nd and/or Y contained at a total content of 0.1 to 2%.

6. The semi-reflective film or reflective film for an optical information recording medium comprising a Ag based alloy according to claim 1 wherein the Ag based alloy contains at least one element selected from the group consisting of Cu, Au, Rh, Pd, and Pt at a total content of 0.1 to 3%.

7. An optical information recording medium having the semi-reflective film comprising an Ag based alloy according to claim 1.

8. An optical information recording medium having the reflective film comprising an Ag based alloy according to claim 1.

9. An Ag based alloy sputtering target wherein the Ag based alloy consists essentially of 0.05 to 4.5% of Bi and 0.05 to 5% of Ge, optionally at least one rare earth metal element, and optionally at least one element selected from the group consisting of Cu, Au, Rh, Pd, and Pt at a total content of 0.1 to 3%, optionally 0.05 to 5% in total of Zn, optionally 0.05 to 5% in total of Al, optionally 0.05 to 5% in total of Ga, optionally 0.05 to 5% in total of In, optionally 0.05 to 5% in total of Si and optionally 0.05 to 5% in total of Ge and Sn.

10. An Ag based alloy sputtering target according to claim 9 wherein the Ag based alloy contains at least one rare earth metal element.

11. An Ag based alloy sputtering target according to claim 10 wherein the rare earth metal element is Nd and/or Y contained at a total content of 0.1 to 2%.

12. An Ag based alloy sputtering target according to claim 10 wherein the Ag based alloy contains at least one element selected from Cu, Au, Rh, Pd, and Pt at a total content of 0.1 to 3%.

13. The film of claim 1, wherein the Ag based alloy contains 0.05 to 5% in total of Zn.

14. The film of claim 1, wherein the Ag based alloy contains 0.05 to 5% in total of Al.

15. The film of claim 1, wherein the Ag based alloy contains 0.05 to 5% in total of Ga.

16. The film of claim 1, wherein the Ag based alloy contains 0.05 to 5% in total of In.

17. The film of claim 1, wherein the Ag based alloy contains 0.05 to 5% in total of Si.

18. The film of claim 1, wherein the Ag based alloy contains Sn and comprises 0.05 to 5% in total of Ge and Sn.

19. The sputtering target of claim 9, wherein the Ag based alloy contains 0.05 to 5% in total of Zn.

20. The sputtering target of claim 9, wherein the Ag based alloy contains 0.05 to 5% in total of Al.

21. The sputtering target of claim 9, wherein the Ag based alloy contains 0.05 to 5% in total of Ga.

22. The sputtering target of claim 9, wherein the Ag based alloy contains 0.05 to 5% in total of In.

23. The sputtering target of claim 9, wherein the Ag based alloy contains 0.05 to 5% in total of Si.

24. The sputtering target of claim 9, wherein the Ag based alloy contains Sn and comprises 0.05 to 5% in total of Ge and Sn.

25. The film of claim 1, wherein the Ag based alloy contains at least one element selected from the group consisting of Zn, Al, Ga, In, and Si.

26. The film of claim 25, wherein the Ag based alloy, contains 0.05 to 5% in total of elements selected from the group consisting of Ge, Sn, Zn, Al, Ga, In, and Si.

27. The sputtering target of claim 9, wherein the Ag based alloy contains at least one element selected from the group consisting of Zn, Al, Ga, In, and Si.

28. The sputtering target of claim 27, wherein the Ag based alloy, contains 0.05 to 5% in total of elements selected from the group consisting of Ge, Sn, Zn, Al, Ga, In, and Si.

* * * * *